(12) United States Patent
Sreepada et al.

(10) Patent No.: US 12,127,294 B2
(45) Date of Patent: Oct. 22, 2024

(54) CORE TRANSMIT SUSPENSION IN MULTIPLE CORE WIRELESS DEVICES, SYSTEMS, AND METHODS

(71) Applicant: Cypress Semiconductor Corporation, San Jose, CA (US)

(72) Inventors: Sridhan Sreepada, Karnataka (IN); Ayush Sood, Karnataka (IN); Kempraju Gopinath, Karnataka (IN)

(73) Assignee: Cypress Semiconductor Corporation, San Jose, CA (US)

( * ) Notice: Subject to any disclaimer, the term of this patent is extended or adjusted under 35 U.S.C. 154(b) by 398 days.

(21) Appl. No.: 17/704,786

(22) Filed: Mar. 25, 2022

(65) Prior Publication Data

US 2023/0309184 A1 Sep. 28, 2023

(51) Int. Cl.
*H04W 76/30* (2018.01)
*H04B 17/318* (2015.01)
*H04L 1/00* (2006.01)
*H04L 5/00* (2006.01)
*H04W 84/12* (2009.01)

(52) U.S. Cl.
CPC .......... *H04W 76/30* (2018.02); *H04B 17/318* (2015.01); *H04L 1/0003* (2013.01); *H04L 5/0053* (2013.01); *H04W 84/12* (2013.01)

(58) Field of Classification Search
CPC ............ H04W 52/02; H04W 52/0274; H04W 52/028; H04W 52/18; H04W 52/24; H04W 84/12; H04L 1/0003; H04L 1/0002; H04L 5/0053; H04L 1/0009; H04L 1/0015; H04L 1/1692; H04L 1/1825
See application file for complete search history.

(56) References Cited

U.S. PATENT DOCUMENTS

| 2016/0336984 A1* | 11/2016 | Demay | ................ | H04W 52/18 |
| 2019/0297569 A1* | 9/2019 | Arora | ..................... | H04W 72/23 |
| 2022/0191792 A1* | 6/2022 | Park | ...................... | H04W 72/20 |

* cited by examiner

*Primary Examiner* — Mohamed A Kamara

(57) ABSTRACT

Core transmit suspension is provided in multiple core wireless devices, systems, and methods. A first wireless device may transmit a plurality of data packets by a first core and a second core of the first wireless device to a second wireless device at a data rate. A data packet may be transmitted by at least one of the first core or the second core. The first wireless device may receive a first core acknowledgement (ACK) of the data packet by the first core and a second core ACK of the data packet by the second core from the second wireless device. The first wireless device may determine that a function of a power metric of the first core ACK and a power metric of the second core ACK satisfies a threshold to produce a result. The first wireless device may suspend, while the data rate sustains, transmission of the plurality of data packets by a suspended core of the first core or the second core based on the result.

20 Claims, 10 Drawing Sheets

CORE TRANSMIT SUSPENSION IN MULTIPLE CORE WIRELESS DEVICES, SYSTEMS, AND METHODS

TECHNICAL FIELD

The present disclosure relates generally to electronic communication systems.

BACKGROUND

Wireless networks increasingly use multiple-input multiple-output (MIMO) radio channels between devices, such as an access point and a client device. Multiple transmitting and receiving antennas may allow multipath propagation between connected devices. Based on an environment of a wireless network and/or a signal path between connected devices, signal quality and/or rate may dynamically change or may remain relatively constant over a period of time. Conventional techniques for communicating between wireless devices over MIMO radio channels may consume greater power than necessary to maintain signal quality and/or rate.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a first wireless device may transmit a plurality of data packets by a first core and a second core to a second wireless device at a data rate. A data packet of the plurality of data packets may be transmitted by at least one of the first core or the second core. The first wireless device may receive, from the second wireless device, a first core acknowledgement (ACK) of the data packet by the first core and a second core ACK of the data packet by the second core. The first wireless device may determine that a function of a power metric of the first core ACK and a power metric of the second core ACK satisfies a threshold to produce a result. The first wireless device may suspend, while the data rate sustains, transmission of the plurality of data packets by a suspended core of the first core or the second core based on the result.

According to some embodiments, a wireless device may include a first core and a second core. The first core may transmit a plurality of data packets, including a data packet, and receive a first core acknowledgement (ACK) of the data packet. The second core may transmit the plurality of data packets, including the data packet, and receive a second core ACK of the data packet. The wireless devices may include a processing device to: control a data rate of the plurality of data packets transmitted by the first core and the second core; determine that a function of a power metric of the first core ACK and a power metric of the second core ACK satisfies a threshold to produce a result; and suspend, while the data rate sustains, transmission of the plurality of data packets by a suspended core of the first core or the second core based on the result.

According to some embodiments, a wireless system may include a plurality of antennas, a first transceiver core coupled to at least one of the plurality of antennas, and a second transceiver core coupled to at least one of the plurality of antennas. The wireless system may include a processing device including one or more processors to: control the first transceiver core to transmit a plurality of data packets including a data packet; control the second transceiver core to transmit the plurality of data packets including the data packet; and control a data rate of the plurality of data packets transmitted by the first transceiver core and the second transceiver core. The one or more processors may: receive, from the first transceiver core, a first core acknowledgement (ACK) of the data packet; receive, from the second transceiver core, a second core ACK of the data packet; determine that a function of a power metric of the first core ACK and a power metric of the second core ACK satisfies a threshold to produce a result; and suspend, while the data rate sustains, transmission of the plurality of data packets by a suspended transceiver core of the first transceiver core or the second transceiver core based on the result.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
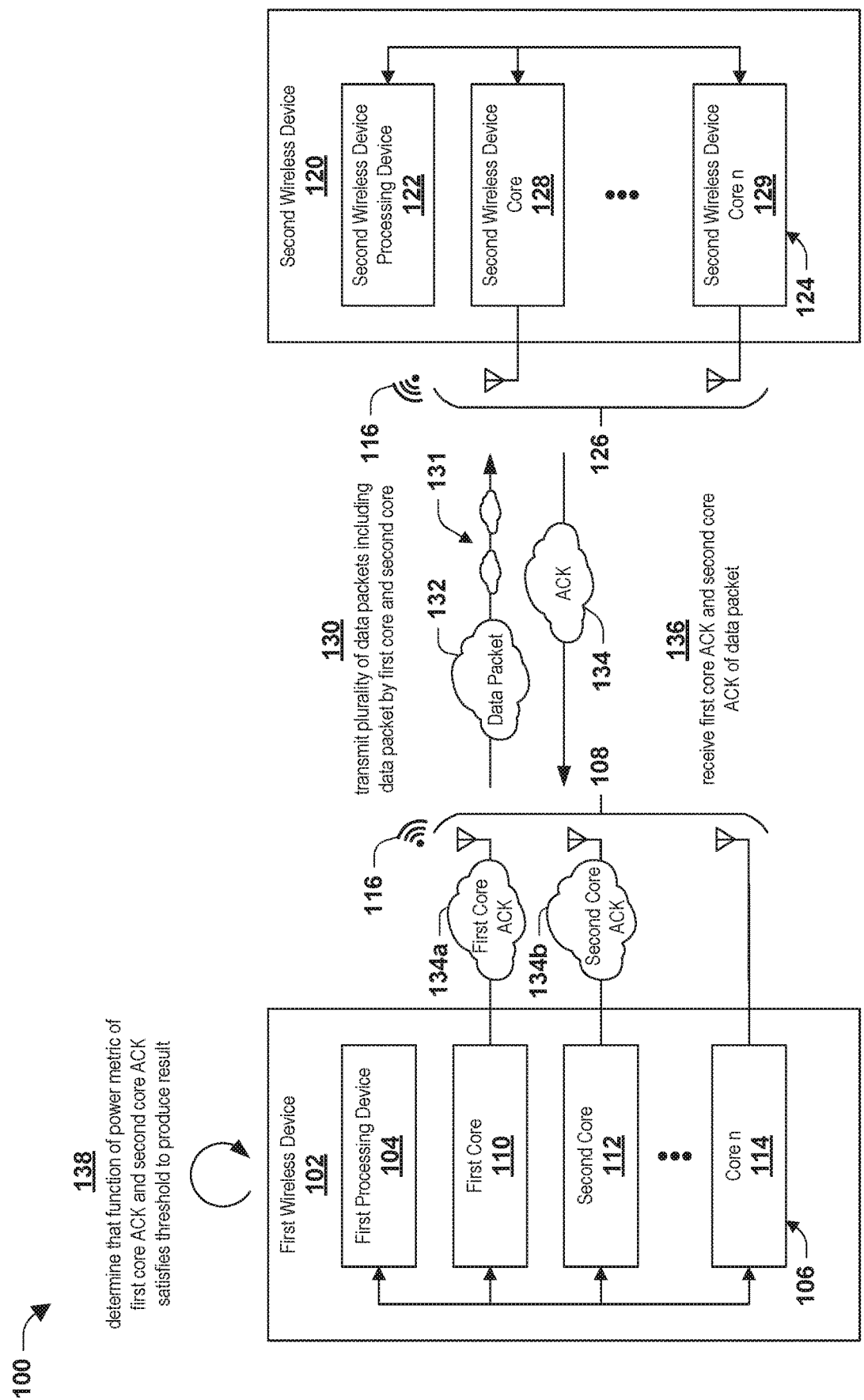
FIGS. 1A-1F are diagrams illustrating an implementation of core transmit suspension, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In view of the above and as set forth in greater detail herein, an environment for a wireless device, such as a MIMO wireless device, may become stabilized such that a data rate of the wireless device transmitting with multiple cores may not exceed a data rate of a reduced number of cores, such as a single core. In such environments, the wireless device transmitting may save power, and thereby extend battery life, by turning OFF one or more transmission cores and continuing to transmit on fewer cores or a single core. In such environments, the wireless device may experience a change in data rate, such as a lower data rate, and the one or more cores previously turned OFF may be turned ON. The various concepts presented throughout this disclosure may be implemented in a wireless device across a broad variety of telecommunication systems, network architectures, and communication standards.

The following description is directed to certain implementations for the purposes of describing innovative aspects of the present disclosure. However, a person having ordinary skill in the art will readily recognize that the teachings herein can be applied in a multitude of different ways. Some of the examples in this disclosure are based on wireless local area network (WLAN) communication or connection in a wireless medium (WM) according to the Institute of Electrical and Electronics Engineers (IEEE) 802.11 wireless standards, also known as WiFi. However, the described implementations may be implemented in any device, system and/or network that is capable of transmitting and receiving radio frequency signals in a WM according to any of the wireless communication standards and/or protocols, including any of the IEEE 802.11 standards.

Some of the examples in this disclosure are based on a wireless device that communicates with one or more wireless devices in a WM. In some embodiments, a wireless device may be a station (STA), which may be a logical entity that is a singly addressable instance of a medium access control (MAC) interface and/or a physical layer (PHY) interface to a WM. In some embodiments, a wireless device may be user equipment (UE), which may be dispersed throughout a wireless network and which may be stationary or mobile. In some embodiments, a wireless device may be an access point (AP), which may comprise: a cellular telephone, a smart phone, a personal digital assistant (PDA), a tablet, a netbook, a smartbook, an ultrabook, a handheld device having wireless connection capability, or some other suitable processing device connected to a wireless modem.

Accordingly, one or more aspects taught herein may be incorporated into: a phone (e.g., a cellular phone, a smart phone), a computer (e.g., a desktop, a server station), a portable communication device, a portable computing device (e.g., a laptop, a personal data assistant, a tablet, a netbook, a smartbook, an ultrabook), a wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system (GPS) device, or any other suitable device that is configured to communicate via a WM.

FIGS. 1A-1F are diagrams illustrating an implementation 100 of core transmit suspension, according to some embodiments. With reference to FIG. 1A and according to some embodiments, a first wireless device 102 includes a first processing device 104 that communicates with a first plurality of cores 106 coupled to a first plurality of antennas 108. The first plurality of cores 106 includes a first core 110, a second core 112, . . . , and core n 114. In some embodiments, each of the first plurality of cores 106 is coupled to a respective antenna of the first plurality of antennas 108. In some embodiments, each of the first plurality of cores 106 is coupled to a shared antenna of the first plurality of antennas 108. In some embodiments the first wireless device 102 is a WLAN device. A second wireless device 120 includes a second wireless device processing device 122 that communicates with a second plurality of cores 124 coupled to a second plurality of antennas 126. The second plurality of cores 124 includes a second wireless device core 128, . . . , and a second wireless device core n 129. In some embodiments, each of the second plurality of cores 124 is coupled to a respective antenna of the second plurality of antennas 126. In some embodiments, each of the second plurality of cores 124 is coupled to a shared antenna of the second plurality of antennas 126. In some embodiments the second wireless device 120 is an AP configured to communicate over the wireless medium 116 according to an 802.11 wireless standard.

As shown by reference number 130, wireless communication may be performed by the first wireless device 102 by transmitting, to the second wireless device 120 and at a data rate, a plurality of data packets 131 by the first core 110 and the second core 112. In some embodiments, the first wireless device 102 is a STA configured to transmit the plurality of data packets 131 according to at least one IEEE 802.11 wireless standard. The plurality of data packets 131 includes a data packet 132 that is transmitted by at least one of the first core 110 or the second core 112. In some embodiments, the data packet 132 is included in the plurality of data packets 131 and transmitted by the first core 110 and the second core 112. In some embodiments, the plurality of data packets 131 is transmitted by the first plurality of cores 106 and the data packet 132 is transmitted by each of the first plurality of cores 106. In some embodiments, the plurality of data packets 131 includes the data packet 132 and may be transmitted in a single spatial stream by the first plurality of cores 106 through the first plurality of antennas 108. An acknowledgment (ACK) 134 of the data packet 132 is transmitted by the second wireless device 120 across the wireless medium 116, which is received by the first core 110 as a first core ACK 134a and is received by the second core 112 as a second core ACK 134b.

According to some embodiments, the plurality of data packets 131 may be transmitted by the first plurality of cores 106 across multiple spatial streams. For example, IEEE 802.11n supports up to four spatial streams for single user MIMO (SU-MIMO), and IEEE 802.11ac and IEEE 802.11ax support up to eight spatial streams for SU-MIMO. In some embodiments for SU-MIMO, the first plurality of cores 106 and the first plurality of antennas 108 may transmit the plurality of data packets 131 as PHY Protocol Data Units (PPDUs) (also known as PHY frames) formed by the first processing device 104. The multiple spatial streams may be transmitted according to a spatial mapping matrix $Q_k$. In some embodiments, the spatial mapping matrix $Q_k$ is a Fast Fourier Transform (FFT) matrix. The spatial mapping matrix $Q_k$ may be a direct mapping matrix in which a diagonal matrix of unit magnitude complex values that takes a form of: $Q_k=I$, the identity matrix; or a Cycle Shift Diversity (CSD) matrix in which diagonal elements represent cyclic shifts in the time domain. The spatial mapping matrix $Q_k$ may be an indirect mapping matrix of a product of a CSD matrix and a unitary matrix, such as a Hadamard matrix or a Fourier matrix. The spatial mapping matrix $Q_k$ may be a spatial expansion matrix of a product of a CSD matrix and a square matrix formed of orthogonal columns. The spatial mapping matrix $Q_k$ may be beamforming steering matrix in which reception in the second wireless device 120 is based on some knowledge of the channel between the first wireless device 102 and the second wireless device 120. For example, using transmit beamforming with explicit feedback, the steering matrix $Q_k$ may be determined using a channel state information (CSI) matrix $H_{eff}$, or a beamforming matrix V for a subcarrier k, $V_k$, in which compressed and/or non-compressed matrix feedback is provided from the first wireless device 102 to the second wireless device 120 for the subcarrier k. Other multiple core and antenna arrangements providing a single spatial stream, multiple spatial streams, or SU-MIMO are within the scope of the present disclosure.

As shown by reference number 136, wireless communication may be performed by the first wireless device 102 by receiving, from the second wireless device 120, the first core ACK 134a of the data packet 132 by the first core 110 and the second core ACK 134b of the data packet 132 by the second core 112. As shown by reference number 138, wireless communication may be performed by the first wireless device 102 by determining that a function of a power metric (PM1) of the first core ACK 134a and a power metric (PM2) of the second core ACK 134b satisfies a threshold (THpm) to produce a result, according to equation 1, as follows:

$$Fn(PM1, PM2) > THpm \qquad \text{Equation 1}$$

where Fn(PM1, PM2) is a function, PM1 is a power metric of the first core ACK 134a, PM2 is a power metric of the second core ACK 134b, and THpm is a threshold. In some embodiments, the threshold THpm may be a predetermined threshold value (e.g., 3 dB). In some embodiments, the result may be a binary condition indicating whether or not the threshold THpm has been met.

In some embodiments, the function Fn(PM1, PM2) determined at reference number 138 is an absolute value of a difference of the power metric (PM1) of the first core ACK 134a and the power metric (PM2) of the second core ACK 134b, according to equation 2, as follows:

$$Fn(PM1, PM2) = |PM1 - PM2|$$

$$|PM1 - PM2| > THpm \qquad \text{Equation 2}$$

In some embodiments, the power metric (PM1) of the first core ACK 136a or the power metric (PM2) of the second core ACK 136b has a power metric type, such as a Receive Signal Strength Indicator (RSSI), a Signal-to-Noise Ratio (SNR), an eigenvalue, or another type of power metric, according to equation 3 as follows:

$$|RSSI1 - RSSI2| > THpm$$

$$|SNR1 - SNR2| > THpm$$

$$|\lambda 1 - \lambda 2| > THpm \qquad \text{Equation 3}$$

where RSSI1 is a receive signal strength indicator of the first core ACK 134a, RSSI2 is a receive signal strength indicator of the second core ACK 134b, SNR1 is a signal-to-noise ratio of the first core ACK 134a, SNR2 is a signal-to-noise ratio of the second core ACK 134b, $\lambda 1$ is an eigenvalue of the first core ACK 134a, and $\lambda 2$ is an eigenvalue of the second core ACK 134b. As set forth in greater detail herein, the function Fn(PM1, PM2), the power metric (PM1) of the first core ACK 134a, and the power metric (PM2) of the second core ACK 134b may be determined by the first processing device 104.

In some embodiments, the data rate may be set by the first processing device 104 in a MAC layer according a modulation coding scheme (MCS) based on one or more parameters of a WiFi connection across the wireless medium 116. In some embodiments, the data rate may be set by the first processing device 104 in a MAC layer independent from a PHY layer. The one or more parameters may include modulation type, coding rate, number of spatial streams, channel width, guard interval, or other parameters such as whether the communication uses Orthogonal Frequency-Division Multiplexing (OFDM) or Orthogonal Frequency-Division Multiple Access (OFDMA). In some embodiments, the modulation type is the phase and amplitude modulation for bit encoding (e.g., 256-QAM). In some embodiments, the coding rate is a number of bits used to transfer information and a number of bits used for error correction. For example, a higher coding rate (e.g., 5/6) transfers more information, but provides less room for error correction than a lower coding rate (e.g., 1/2). In some embodiments, the number of the spatial streams is the number of independent data streams are used by the first plurality of cores 106 across the wireless medium 116. A high number of spatial streams (e.g., 4 streams) may increase the data rate, but may be susceptible to greater noise and/or interference than a low number of spatial streams (e.g., 1 or 2 streams). In some embodiments, the channel width is the size of the channel used for communication across the wireless medium 116. For example, a wider channels can achieve higher bandwidth, but doubling the channel width may also increase the noise floor by 3 dB, which may decrease SNR. In some embodiments, the guard interval is the pause between transmission of each of the plurality of data packets 131. For example, short pauses (e.g., 0.8 μS) may permit the transmission of more packets, but may increase prospects for interference compared to longer pauses (e.g., 3.2 μS). The guard interval may be based on a fraction of a symbol period. For example a long guard interval, such as (1/4) may provide higher protection from interference but may provide a lower data rate than a short guard interval (e.g., 1/32).

According to some embodiments, the data rate may be set by the first processing device 104 according to the MCS. For example, IEEE 802.11ax introduces 2880 new data rates, with a total number of data rates exceeding 3500. In IEEE 802.11n and 802.11ac, the data rate may be calculated according to equation 4, as follows:

$$\text{Data Rate} = \frac{N_{SD} * N_{BPSCS} * R * N_{SS}}{T_{DFT} + T_{GI}} \qquad \text{Equation 4}$$

where $N_{SD}$ is the number of data subcarriers, $N_{BPSCS}$ is the number of coded bits per subcarrier per stream, R is the coding (e.g., 1/2, 2/3, 3/4, 5/6), $N_{SS}$ is the number of spatial streams, $T_{DFT}$ is the OFDM symbol duration, and $T_{GI}$ is the guard interval. In IEEE 802.11ax, the data rate may be calculated according to equation 5, as follows:

$$\text{Data Rate} = \frac{N_{SD,U} * N_{BPSCS,U} * R * N_{SS}}{T_{DFT} + T_{GI}} \qquad \text{Equation 5}$$

where $N_{SD,U}$ is the number of data subcarriers per resource unit, $N_{BPSCS,U}$ is the number of coded bits per subcarrier per stream for the resource unit, R is the coding, $N_{SS}$ is the number of spatial streams, $T_{DFT}$ is the OFDM symbol duration, and $T_{GI}$ is the guard interval.

According to some embodiments, the data rate may depend upon a number of Request To Send (RTS) packets and/or a number of Clear To Send (CTS) packets included in the plurality of data packets 131. In some embodiments, the data rate may be determined by including RTS and CTS packets. In some embodiments, the data rate may be determined without including RTS and CTS packets. Without including the RTS and CTS packets, the data rate may be expressed as an Average Time Per Packet (ATPP), and may be determined by the first processing device 104 according to equation 6, as follows:

$$ATPP = DIFS + ABT + PTT + SIFS + ACK_{TT} \quad \text{Equation 6}$$

where ATTP is the average time per packet, DIFS is the distributed coordination function (DCF) interframe space duration, PTT is the packet transmission time, SIFS is the short interframe space, and $ACK_{TT}$ is the ACK transmission time. Other arrangements and/or configurations for determining the data rate for communication across the wireless medium 116 are within the scope of the present disclosure.

In some embodiments, the threshold at reference number 138 is expressed in decibels (dB). An example threshold may be 3 dB. As set forth in greater detail herein, wireless communication may be performed by the first wireless device 102 by adjusting the threshold based on the data rate of the plurality of data packets 131 transmitted by the first core 110 and the second core 112. In some embodiments, the threshold may be determined by a look-up table (LUT) accessed by the first processing device 104 or a function calculated by the first processing device 104 based on the type of the power metric (e.g., RSSI, SNR, eigenvalue, etc.). In some embodiments, the threshold may be determined by the LUT accessed by the first processing device 104 or a function calculated by the first processing device 104 based on the data rate. The LUT may provide a threshold corresponding to each type of power metric or each data rate of the MCS used by the first wireless device 102 for wireless communication across the wireless medium 116. For example, in IEEE 802.11ax for a channel width of 80 MHz, an OFDM symbol duration of 12.8 μS, an MCS index of 7, a number of spatial streams of 2, a modulation of 64-QAM, a coding of ⅚, and a guard interval of 0.8 μS provides a data rate of 720.6 megabits per second (Mbps). In this example, an example threshold may be 3 dB. In some embodiments, the data rate may be inversely proportional to the threshold such that a higher data rate corresponds to a lower threshold. For example, a higher data rate may be a data rate greater than one standard deviation above a mean data rate for the first wireless device 102. In this example, a lower threshold may be a threshold greater than half a standard deviation below a mean threshold for the first wireless device 102. In an example of IEEE 802.11ax for a channel width of 80 MHz, an OFDM symbol duration of 12.8 μS, an MCS index of 10, a number of spatial streams of 2, a modulation of 1024-QAM, a coding of ¾, and a guard interval of 0.8 μS, a data rate may be 1080.9 Mbps. In this example, the threshold may be 2 dB. In some embodiments, the data rate may be inversely proportional to the threshold such that a lower data rate corresponds to a higher threshold. For example, a lower data rate may be a data rate greater than one standard deviation below a mean data rate for the first wireless device 102. In this example, a higher threshold may be a threshold greater than half a standard deviation above a mean threshold for the first wireless device 102. In an example of IEEE 802.11ax for a channel width of 80 MHz, an OFDM symbol duration of 12.8 μS, an MCS index of 3, a number of spatial streams of 2, a modulation of 16-QAM, a coding of ½, and a guard interval of 0.8 μS, a data rate may be 288.2 Mbps. In this example, the threshold may be 4 dB. Other arrangements and/or configurations for adjusting the threshold based on the type of the power metric or the data rate are within the scope of the present disclosure.

Figure 1B:
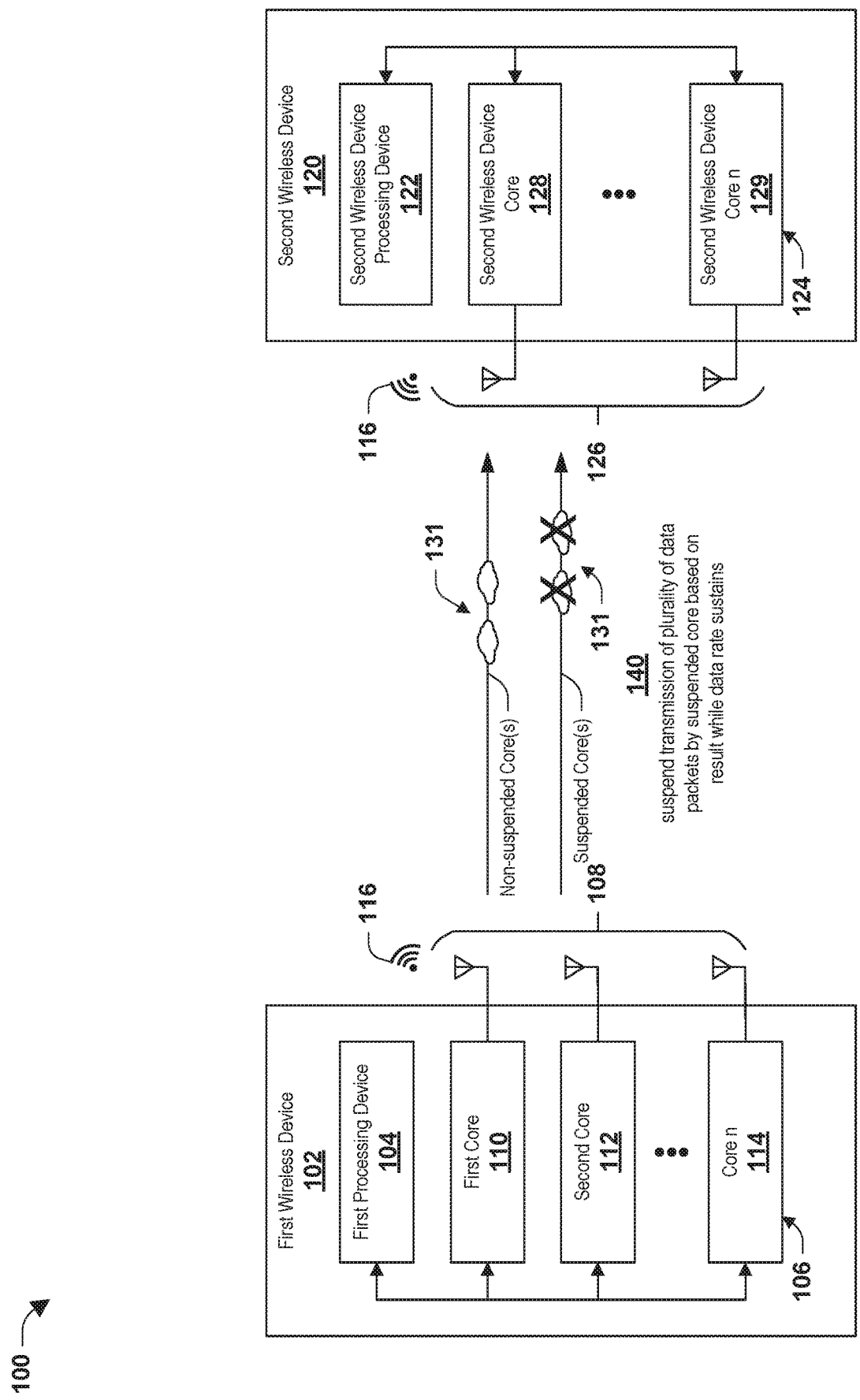

With reference to FIG. 1B and according to some embodiments, as shown by reference number 140, wireless communication may be performed by the first wireless device 102 by suspending, while the data rate sustains, transmission of the plurality of data packets 131 by a suspended core of the first core 110 or the second core 112 based on the result determined at reference number 138. In some embodiments, transmission of the plurality of data packets 131 is suspended for a first plurality of suspended cores of the first plurality of cores 106 based on the result determined at reference number 138. In some embodiments the first wireless device has two cores. In this case, the first core 110 is the suspended core when the power metric of the first core ACK 134a is less than the power metric of the second core ACK 134b, and the second core 112 is the suspended core when the power metric of the first core ACK 134a is greater than the power metric of the second core ACK 134b.

Figure 1C:
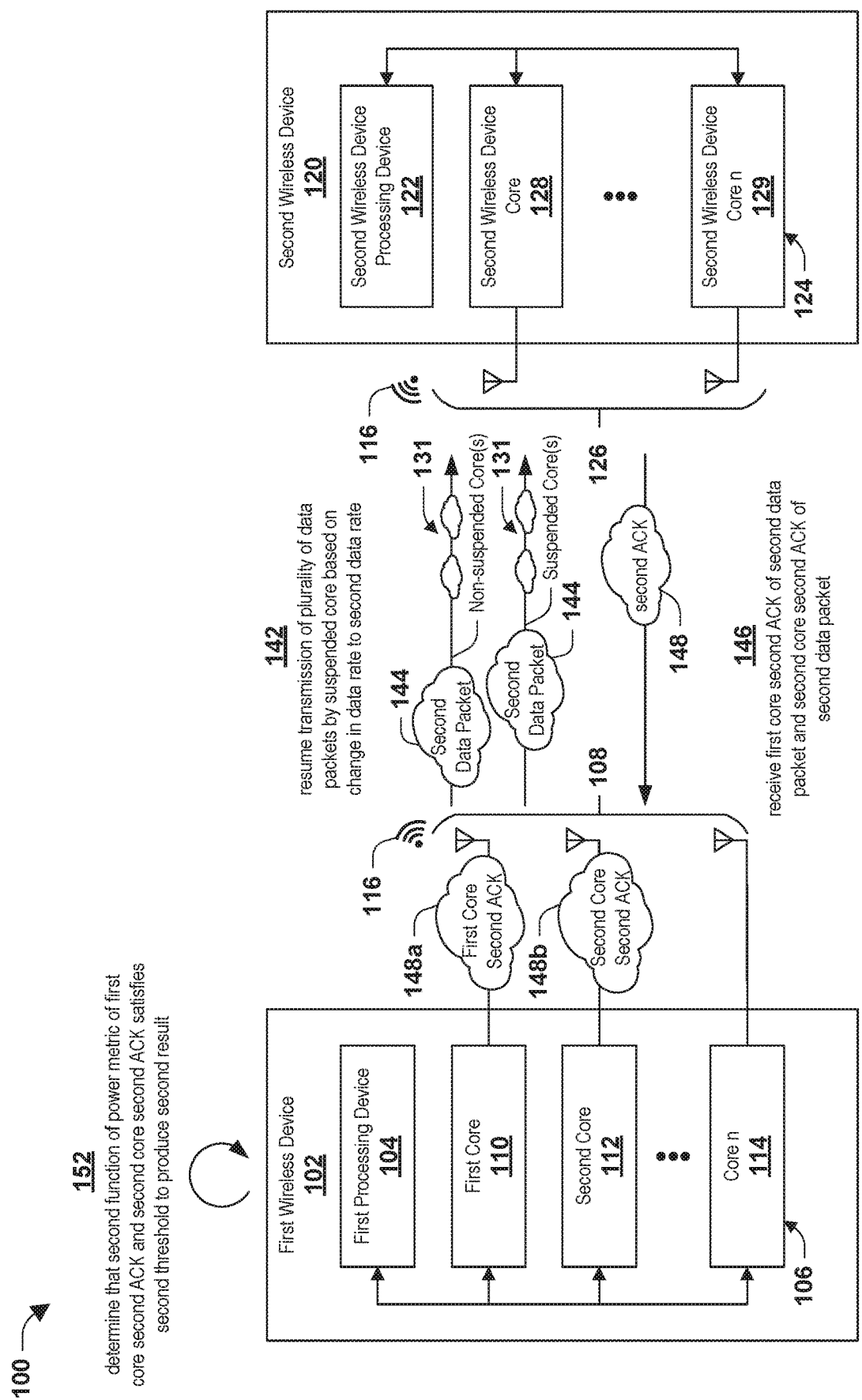

With reference to FIG. 1C and according to some embodiments, as shown by reference number 142, wireless communication may be performed by the first wireless device 102 by resuming the transmission of the plurality of data packets 131 by the suspended core based on a change in the data rate to a second data rate. The data rate may be changed by the first processing device 104 in a MAC layer according a MCS based on one or more parameters of a WiFi connection, as set forth herein. A second data packet 144 of the plurality of data packets 131 may be transmitted by at least one of the first core 110 or the second core 112 at the second data rate. As shown by reference number 146, wireless communication may be performed by the first wireless device 102 by receiving, from the second wireless device 120, a second ACK 148 of the second data packet 144. The second ACK 148 is transmitted by the second wireless device 120 across the wireless medium 116, which is received by the first core 110 as a first core second ACK 148a and is received by the second core 112 as a second core second ACK 148b. As shown by reference number 152, wireless communication may be performed by the first wireless device 102 by determining that a second function of a power metric of the first core second ACK 148a and a power metric of the second core second ACK 148b satisfies a second threshold to produce a second result.

Figure 1D:
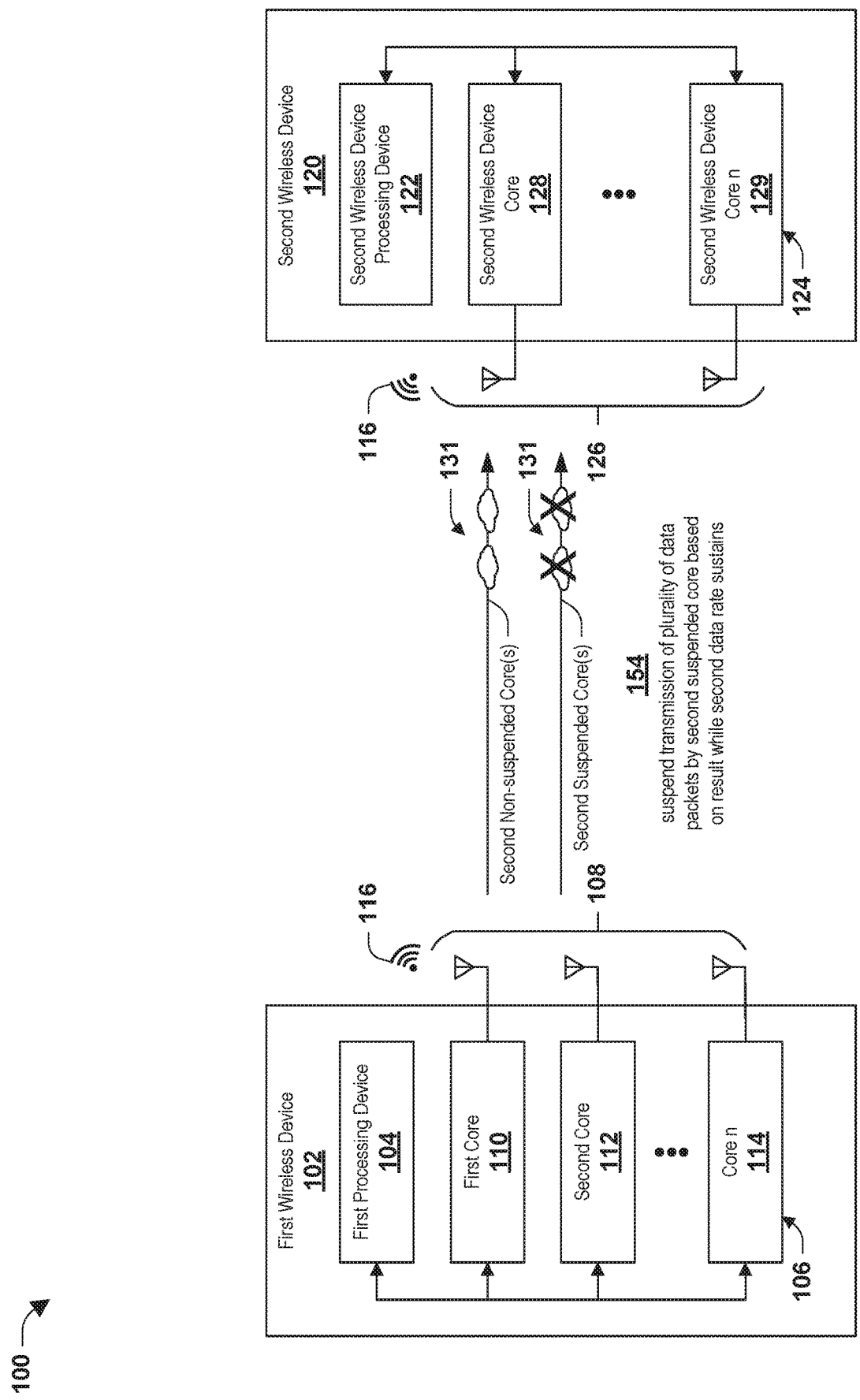

With reference to FIG. 1D and according to some embodiments, as shown by reference number 154, wireless communication may be performed by the first wireless device 102 by suspending, while the second data rate sustains, transmission of the plurality of data packets 131 by a second suspended core of the first core or the second core based on the second result determined at reference number 152. In some embodiments, transmission of the plurality of data packets 131 is suspended for a second plurality of suspended cores of the first plurality of cores 106 based on the second result determined at reference number 152. In some embodiments the first wireless device 102 has two cores. In this case, the first core 110 is the suspended core when the power metric of the first core second ACK 148a is less than the power metric of the second core second ACK 148b, and the second core 112 is the suspended core when the power metric of the first core second ACK 148a is greater than the power metric of the second core second ACK 148b.

Figure 1E:
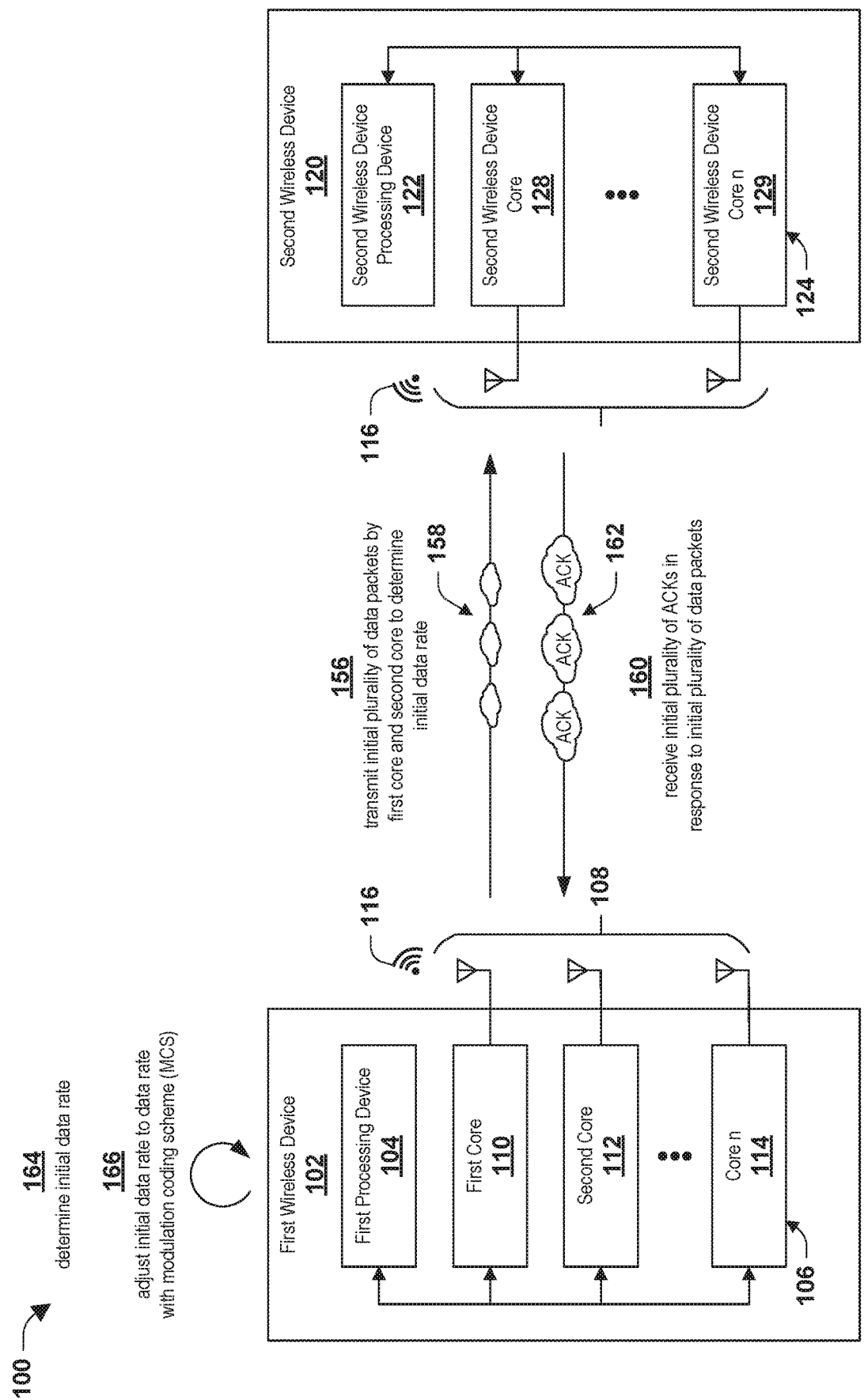

With reference to FIG. 1E and according to some embodiments, as shown by reference number 156, wireless communication may be performed by the first wireless device 102 by transmitting, to the second wireless device 120 and before transmitting the plurality of data packets 131 by the first core 110 and the second core 112, an initial plurality of data packets 158 by the first core 110 and the second core 112 to determine an initial data rate. In some embodiments and as shown by reference number 160, an initial plurality of ACKs 162 may be received by the first wireless device 102 from the second wireless device 120 in response to transmission of the initial plurality of data packets 158. As shown by reference number 164, based on the transmission of the initial plurality of data packets 158 and reception of the initial plurality of ACKs 162, the first wireless device may determine an initial data rate.

As shown by reference number 166, wireless communication may be performed by the first wireless device 102 by adjusting, before transmitting the plurality of data packets 131 by the first core 110 and the second core 112 as shown by reference number 130, the initial data rate to the data rate. The adjusting at reference number 166 may be performed by the first processing device 104 with a MCS based on a number of spatial streams, a coding metric, and/or a number of ACKs received per unit of time, from the second wireless device 120, in response to transmitting the initial plurality of data packets 158 by the first core 110 and the second core 112, as set forth herein. In some embodiments, the coding metric is at least one of a number of data subcarriers, a number of coded bits per subcarrier per stream, a convolutional coding rate, a symbol duration, or a guard interval duration.

Figure 1F:
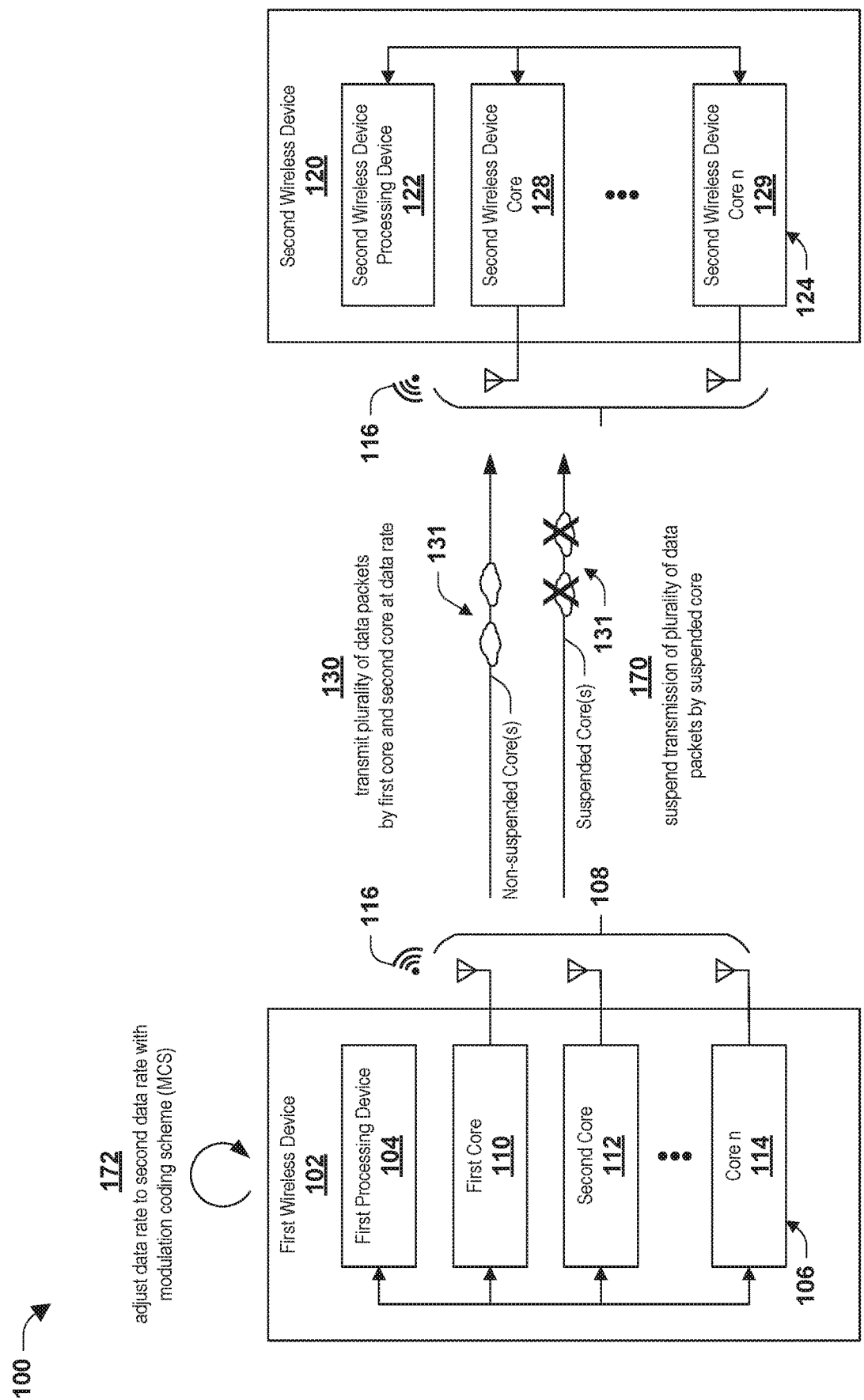

With reference to FIG. 1F and according to some embodiments, as shown by reference number 130, the plurality of data packets 131 may be transmitted by the first core 110 and the second core 112 at a data rate, as set forth herein. At 170, wireless communication may be performed by the first wireless device 102 by suspending transmission of the plurality of data packets 131 by a suspended core, as set forth herein. At 172, wireless communication may be performed by the first wireless device 102 by adjusting the data rate to a second data rate with a MCS while suspending the transmission of the plurality of data packets by the suspended core, at 170. In some embodiments, the MCS is based on at least one of: a coding metric, or a number of ACKs received per unit of time, from the second wireless device 120, in response to transmitting the plurality of data packets 131. In some embodiments, adjusting the data rate to the second data rate at 172 is performed with the MCS by a MAC unit of the first wireless device 102 without changing a number of spatial streams in response to suspending the transmission of the plurality of data packets 131 by the suspended core at 170. In some embodiments, suspending the transmission of the plurality of data packets 131 by the suspended core at 170 is performed by a PHY unit of the first wireless device 102 independently from adjusting the data rate with the MCS. Other arrangements and/or configurations for adjusting the data rate to a second data rate are within the scope of the present disclosure.

Figure 2:
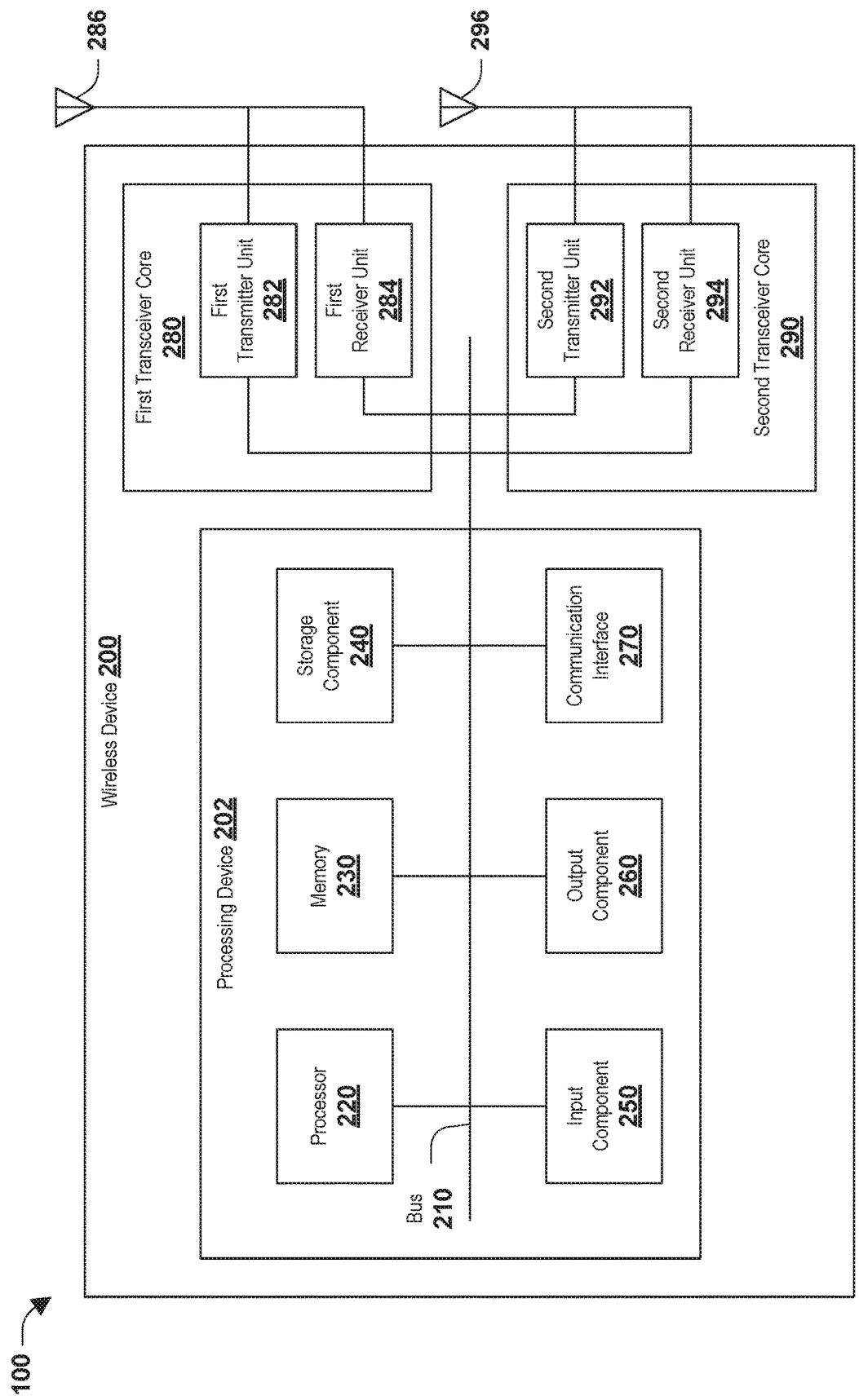
FIG. 2 is a diagram illustrating an implementation of core transmit suspension in a wireless device, according to some embodiments.

FIG. 2 is a diagram illustrating an implementation 100 of core transmit suspension in a wireless device 200, according to some embodiments. In some embodiments, the wireless device 200 may correspond to the first wireless device 102 and/or the second wireless device 120 of FIGS. 1A-1F. In some embodiments, the wireless device 200 includes a processing device 202 that may correspond to the first processing device 104 or the second wireless device processing device 122 of FIGS. 1A—1F. As illustrated in FIG. 2, the wireless device 200 includes a bus 210, a processor 220, a memory 230, a storage component 240, an input component 250, an output component 260, a communication interface 270, a first transceiver core 280, and a second transceiver core 290. The first transceiver core 280 may include a first transmitter unit 282 and a first receiver unit 284 electrically coupled to one or more antennas, such as a first antenna 286. In some implementations, the first transmitter unit 282 and the first receiver unit 284 may be individually coupled to individual antennas or may be coupled to a shared antenna, such as the first antenna 286. The second transceiver core 290 may include a second transmitter unit 292 and a second receiver unit 294 electrically coupled to one or more antennas, such as a second antenna 296. In some implementations, the second transmitter unit 292 and the second receiver unit 294 may be individually coupled to individual antennas or may be coupled to a shared antenna, such as the second antenna 296. In some embodiments, the first transceiver core 280 or the second transceiver core 290 may correspond to one of the cores of the first wireless device 102 (e.g., the first core 110, the second core 112, . . . , the core n 114) or one of the cores of the second wireless device 120 (e.g., the second wireless device core 128, . . . , the second wireless device core n 129).

The bus 210 includes a component that permits communication among the components of the wireless device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 may include a random access memory (RAM), a read only memory (ROM), an electrically erasable programmable read-only memory (EEPROM), a serial peripheral interface (SPI) memory, one or more storage registers, and/or another type of dynamic or static storage device (e.g., a flash memory, a magnetic memory, and/or an optical memory) that stores information and/or instructions for use by the processor 220.

The storage component 240 stores information and/or software related to the operation and use of the wireless device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The input component 250 may include a component that permits the wireless device 200 to receive information, such as via user input (e.g., a touch screen display, a keyboard, a keypad, a mouse, a button, a switch, and/or a microphone) and/or another hardware element. Additionally, or alternatively, the input component 250 may include a sensor for sensing information (e.g., a global positioning system (GPS) component, an accelerometer, a gyroscope, and/or an actuator). The output component 260 may include a component that provides output information from the wireless device 200 (e.g., a display, a speaker, and/or one or more light-emitting diodes (LEDs)). The communication interface 270 may include a transceiver-like component (e.g., a transceiver and/or a separate receiver and transmitter) that enables the wireless device 200 to communicate with other devices, such as via a wired connection, a wireless connection, or a combination of wired and wireless connections. The communication interface 270 may permit the wireless device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

In some embodiments, the wireless device 200 may perform one or more processes described herein. The wireless device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices. Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software. The number and arrangement of the components shown in FIG. 2 are provided as an example. In practice, the wireless device 200 may include additional components, fewer components, different components, or differently arranged components than those shown in FIG. 2. Additionally, or alternatively, a set of components (e.g., one or more components) of the wireless device 200 may perform one or more functions described as being performed by another set of components of the wireless device 200.

Figure 3:
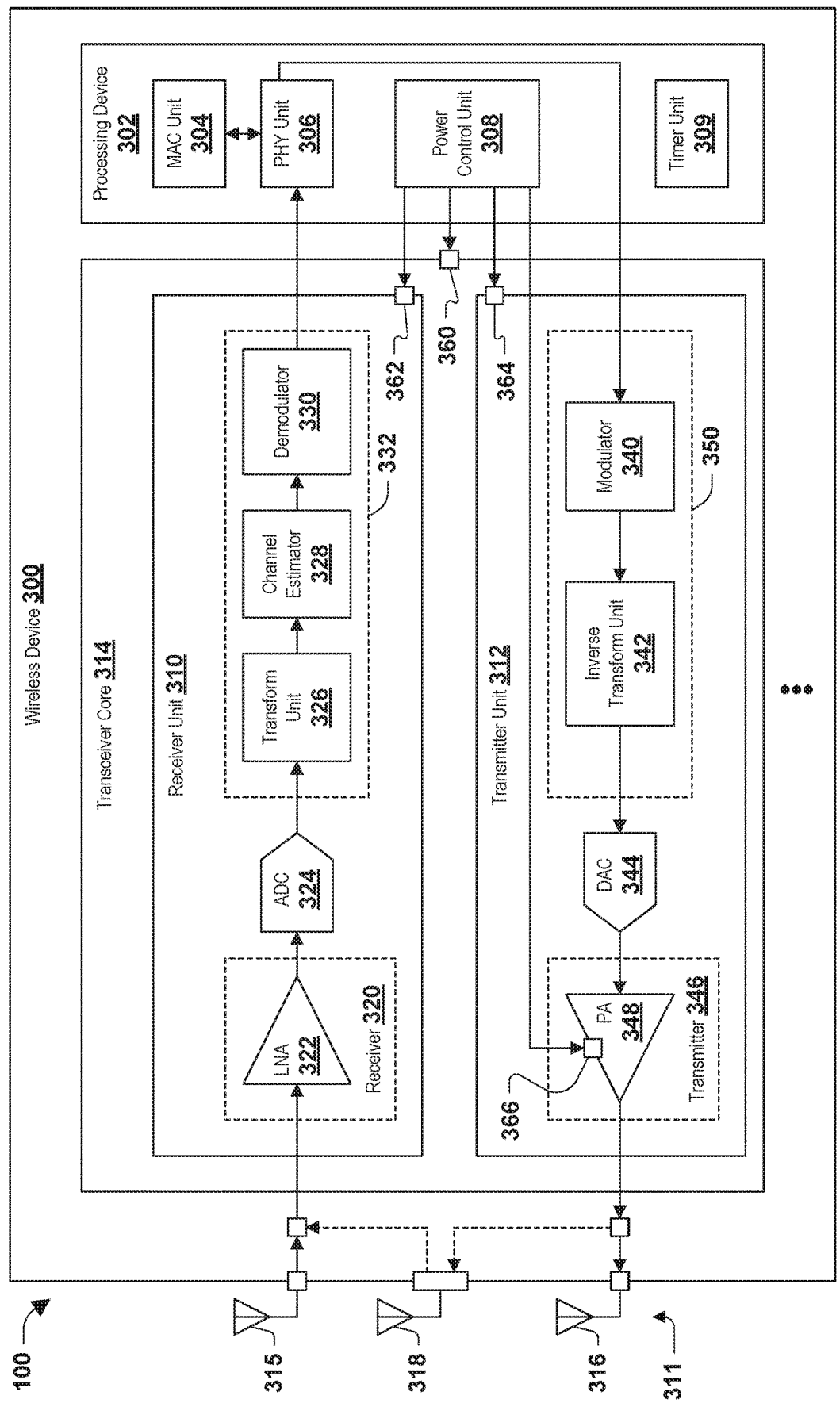
FIG. 3 is a diagram illustrating an implementation of core transmit suspension in a wireless device, according to some embodiments.

FIG. 3 is a diagram illustrating an implementation 100 of core transmit suspension in a wireless device 300, according to some embodiments. For example, the wireless device 300 may take the form of the first wireless device 102 or the second wireless device 120 of FIGS. 1A-1F, or the wireless device 200 of FIG. 2. The wireless device 300 may include a processing device 302 that controls operation of the wireless device 300 through various components described in greater detail herein. The processing device 302 typically performs logical and arithmetic operations based on program instructions stored within a memory, wherein the memory may be executable to implement the methods described herein. In some embodiments, the processing device 302 may include a digital signal processor (DSP) for use in processing signals. For example, the DSP may be configured to generate a data unit for transmission, such as a PPDU. In some aspects, the PPDU may be referred to as a data packet. The processing device 302 may include a MAC unit 304, a PHY unit 306, a power control unit 308, and a timer unit 309. As set forth herein, the wireless device 300 may be a WLAN device, such as a STA or an AP, to transmit and/or receive a plurality of data packets having a plurality of MAC header types according to at least one IEEE 802.11 wireless standard.

According to some embodiments, when the wireless device 300 is implemented or used as a transmitting node, the MAC unit 304 may be configured to select one of a plurality of MAC header types, and to generate a data packet having that MAC header type. For example, the MAC unit 304 may be configured to generate a data packet including a MAC header and a payload and to determine what type of MAC header to use. When the wireless device 300 is implemented or used as a receiving node, the MAC unit 304 may be configured to process data packets of a plurality of different MAC header types. For example, the MAC unit 304 may be configured to determine the type of MAC header used in a data packet and process the data packet and/or fields of the MAC header. The MAC unit 304 and the PHY unit 306 may be configured to operate independently and may be configured to communicate information, such as a data packet to be received or transmitted. The wireless device 300 may implement only functionality of a transmitting node, only functionality of a receiving node, or functionality of both a transmitting node and a receive node. According to some embodiments, the PHY unit 306 may be configured to communicate data packets with one or more receiver units, such as a receiver unit 310, and one or more transmitter units, such as a transmitter unit 312.

In some embodiments, the wireless device 300 includes a plurality of transceiver cores, such as a transceiver core 314. The processing device 302 may communicate information, such as data packets, with the transceiver cores and/or control operation of the transceiver cores directly or indirectly, such as through intermediate components. In some embodiments, the receiver unit 310 and the transmitter unit 312 may be configured to cooperate as components of a single transceiver device, such as the transceiver core 314, to communicate data packets between the PHY unit 306 and one or more antennas, such as a plurality of antennas 311. In some embodiments, the first transceiver core 280 or the second transceiver core 290, illustrated in FIG. 2, may be implemented as the transceiver core 314. In some embodiments, each of the first plurality of cores 106 or the second plurality of cores 124, illustrated in FIGS. 1A-1F, may be implemented as the transceiver core 314. For example, the first core 110 of FIG. 1A may be implemented as the transceiver core 314 to transmit the plurality of data packets 131, including the data packet 132, and receive the first core ACK 134a of the data packet 132. In another example, the second core 112 of FIG. 1A may be implemented as the transceiver core 314 to transmit the plurality of data packets 131, including the data packet 132, and receive the second core ACK 134b of the data packet 132.

In some embodiments, each of the first plurality of cores 106 or the second plurality of cores 124, illustrated in FIGS. 1A-1F, may be implemented as a component of the transceiver core 314, such as the receiver unit 310 or the transmitter unit 312. For example, the first core 110 of FIG. 1A may include a first transmitter unit, such as the transmitter unit 312, for transmitting the plurality of data packets 131, and a first receiver unit, such as the receiver unit 310, for receiving the first core ACK 134a of the data packet 132. In another example, the second core 112 of FIG. 1A may include a second transmitter unit, such as the transmitter unit 312, for transmitting the plurality of data packets 131, and a second receiver unit, such as the receiver unit 310, for receiving the second core ACK 134b of the data packet 132.

In some embodiments, the receiver unit 310 may be electrically coupled to a receiver antenna 315 to receive data packets, and the transmitter unit 312 may be electrically coupled to a transmitter antenna 316 to transmit data packets. In some embodiments, the receiver unit 310 and the transmitter unit 312 may be electrically coupled to a shared antenna 318 to communicate data packets. The wireless device 300 may also include (not shown) multiple receiver units, multiple transmitter units, multiple transceiver cores, and/or multiple antennas. The receiver unit 310 and the transmitter unit 312 may take the form of an integrated device (e.g., embodied as a transmitter circuit and a receiver circuit of a single communication device) in some implementations, may take the form of a separate receiver device and a separate transmitter device in some implementations, or may be embodied in other implementations. According to some embodiments, the receiver unit 310 may be used to detect and quantify a level of signals received by the transceiver core 314, received by the receiver unit 310, and/or transmitted by the transmitter unit 312. The receiver unit 310 may detect and/or output a power metric of a signal and/or data packet, such as total energy, energy per subcarrier per symbol, power spectral density, RSSI, SNR, an eigenvalue, or other power metric.

FIG. 3 illustrates various components of the receiver unit 310 that may be utilized in the wireless device 300 to receive wireless communication and/or a plurality of data packets, according to some embodiments. The illustrated components may be used, for example, to receive OFDM communication, to receive MIMO communication, to receive SU-MIMO communication, or other communication which may or may not be subject to beamforming. In some embodiments, the receiver unit 310 may include a receiver 320, a receive amplifier 322, an analog to digital converter 324, a transform unit 326, a channel estimator 328, and a demodulator 330.

In some embodiments, the receiver 320 may be configured to receive one or more data packets in a wireless signal that may be processed and/or decoded as set forth herein. The receiver 320 may include the receive amplifier 322 that may be configured as a low noise amplifier to amplify a wireless signal received by the receiver 320. In some embodiments, the receiver 320 may be configured to adjust the gain of the receive amplifier 322 using an automatic gain control (AGC). In some aspects, AGC may use information in one or more received training fields, such as a received short training field (STF), for example, to adjust the gain. The analog to digital converter 324 may be configured to convert the amplified wireless signal from the receiver 320 into a digital representation thereof. In some embodiments, the wireless signal may be processed before conversion by the analog to digital converter 324, for example by being filtered or down-converted to an intermediate or baseband frequency. The transform unit 326 may be configured to convert the digital representation of the wireless signal into a frequency spectrum. In some embodiments, the transform unit 326 may be an FFT unit that transforms the wireless signal using a fast Fourier transform. In some embodiments, the wireless signal is a modulated signal and the transform unit 326 may identify a symbol associated with each point in the modulated wireless signal. The transform unit 326 may be configured with a plurality of modes, and may use a different number of points to convert the modulated wireless signal in each mode. The number of points used by the transform unit 326 may be referred to as the size of the transform unit 326.

In some embodiments, the channel estimator 328 may be configured to form an estimate of the channel over which the data packets are received, and to remove certain effects of the channel based on the channel estimate. For example, the channel estimator 328 may be configured to approximate a function of the channel, and may be further configured to equalize the channel by applying an inverse of that function to the data in a frequency spectrum. The demodulator 330 may be configured to demodulate the equalized data. For example, the demodulator 330 may determine a plurality of bits from symbols output by the transform unit 326 and the channel estimator 328. The demodulator 330 may determine the plurality of bits by, for example, reversing a mapping of bits to a symbol in a constellation and thereby decode information from the wireless signal. In some embodiments, the bits may correspond to codewords. In some embodiments, the demodulator 330 may include a quadrature amplitude modulation (QAM) demodulator, such as an 8-QAM demodulator, a 64-QAM demodulator, a 128-QAM demodulator, a 256-QAM demodulator, etc. In some embodiments, the demodulator 330 may include another type of demodulator, such as a binary phase-shift keying (BPSK) demodulator, a quadrature phase-shift keying (QPSK) demodulator, etc. In some embodiments, the transform unit 326, the channel estimator 328, and/or the demodulator 330 may be implemented as separate components or combined in a single processing component, such as a DSP 332. As set forth herein, the wireless signal received at the receiver 320 may include one or more data units. Using the functions and/or components described herein, the data units or data symbols therein may be decoded, otherwise evaluated, or processed to produce one or more data packets. For example, the processing device 302 and/or the DSP 332 may be used to decode data symbols in the data units using the transform unit 326, the channel estimator 328, and the demodulator 330. Other arrangements and/or configurations of the receiver unit 310 to convert the wireless signal into one or more data packets are within the scope of the present disclosure.

FIG. 3 illustrates various components of the transmitter unit 312 that may be utilized in the wireless device 300 to transmit wireless communication and/or a plurality of data packets, according to some embodiments. The illustrated components may be used, for example, to transmit OFDM communication, to transmit MIMO communication, to transmit SU-MIMO communication, or other communication which may be subject to beamforming. In some embodiments, the transmitter unit 312 may include a modulator 340, an inverse transform unit 342, a digital to analog converter 344, a transmitter 346, and a transmit amplifier 348.

In some embodiments, the modulator 340 may be configured to modulate bits received from the PHY unit 306 for transmission. The modulator 340 may be configured to determine a plurality of symbols from bits received from the PHY unit 306, for example by mapping bits to a plurality of symbols according to a constellation. The bits may correspond to one or more data packets, control packets, or other types of data and/or control information. In some embodiments, the bits may correspond to codewords. In some embodiments, the modulator 340 may include a QAM modulator, such as an 8-QAM modulator, a 64-QAM modulator, a 128-QAM modulator, a 256-QAM modulator, etc. In some embodiments, the modulator 340 may include another type of modulator, such as a BPSK modulator, a QPSK demodulator, etc.

In some embodiments, the inverse transform unit 342 may be configured to convert symbols or otherwise modulated bits from the modulator 340 into a time domain. In some embodiments, the inverse transform unit 342 may be an inverse fast Fourier transform (IFFT) unit that provides an inverse transform to the modulated bits received from the modulator 340. In some embodiments, there may be multiple inverse transform units (not shown) that transform units of data of different sizes. In some embodiments, the inverse transform unit 342 may be itself configured to provide an inverse transform to units of data of different sizes. For example, the inverse transform unit 342 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the inverse transform unit 342 may be referred to as the size of the inverse transform unit 342. In some embodiments, the modulator 340 and/or the inverse transform unit 342 may be implemented as separate components or combined in a single processing component, such as a DSP 350. In some embodiments, the DSP 332 and the DSP 350 may be implemented as separate components, may be implemented in a single component (e.g., a single DSP), or may be implemented as combinations with other components, such as the processing device 302. As set forth herein, the DSP 350 may be configured to generate a data unit for transmission. In some embodiments, the modulator 340 and the inverse transform unit 342 may be configured to generate a data unit including a plurality of fields including control information and a plurality of data symbols. Using the functions and/or components described herein, the data units or data symbols therein may be encoded, otherwise evaluated, or processed to include one or more data packets. For example, the processing device 302 and/or the DSP 350 may be used to encode data symbols in the data units using the inverse transform unit 342 and the modulator 340. Other arrangements and/or configurations of the transmitter unit 312 to convert one or more data packets to a signal to be transmitted are within the scope of the present disclosure.

In some embodiments, the digital to analog converter 344 may be configured to convert the output of the inverse transform unit 342 into an analog signal. For example, the time-domain output of the inverse transform unit 342 may be converted to a baseband OFDM signal by the digital to analog converter 344. The digital to analog converter 344 may be implemented in the transmitter unit 312 as a separate component, an element of another component, or as combinations with other components, such as the processing device 302 or the DSP 350. The analog signal may be wirelessly transmitted by the transmitter 346. The analog signal may be further processed before being transmitted by the transmitter 346, for example by being filtered or by being upconverted to an intermediate or carrier frequency. In some embodiments, the transmitter 346 includes a transmit amplifier 348. Prior to being transmitted, the analog signal may be amplified by the transmit amplifier 348. In some embodiments, the transmit amplifier 348 may include a power amplifier (PA). The transmitter 346 may be configured to transmit one or more data packets or data units in a wireless signal based on the analog signal. The data units may be generated using the processing device 302 and/or the DSP 350, for example using the modulator 340 and the inverse transform unit 342 as described herein.

In some embodiments, data units exchanged by the wireless device 300 with another wireless device over a WM may include control information or data, as discussed above. At the PHY layer, these data units may be referred to as PPDUs. In some embodiments, a PPDU may be referred to as a data packet or a physical layer packet. Each PPDU may include a preamble and a payload. The preamble may include training fields and a SIG field that carries information to interpret the PPDU (e.g., coding, MCS index, cyclic redundancy check (CRC), number of space-time streams (NSTS), etc.). The payload may include, for example, a MAC header or data for other layers, and/or user data. The payload may be transmitted using one or more data symbols. The systems, methods, and devices herein may utilize data units with training fields whose peak-to-power ratio has been minimized.

The transmitter unit 312, as shown in FIG. 3, is an example of a single transmit chain used for transmitting via an antenna, such as the transmitter antenna 316 or the shared antenna 318. The receiver unit 310 as shown in FIG. 3 is an example of a single receive chain used for receiving via an antenna, such as the receiver antenna 315 or the shared antenna 318. In some embodiments, the transmitter unit 312 or the receiver unit 310 may implement a portion of a MIMO system using multiple antennas to simultaneously transmit data. Although a number of separate components are illustrated in FIG. 3, one or more of the components may be combined or commonly implemented. For example, the processing device 302 may be used to implement not only the functionality described above, but also to implement the functionality described above with respect to the transceiver core 314, the DSP 332, and/or the DSP 350. Each of the components illustrated in FIG. 3 may be implemented using a plurality of separate elements. Further, the processing device 302 may be used to implement any of the components, modules, circuits, or the like described herein, or each may be implemented using a plurality of separate elements. Other arrangements and/or configurations of the transmitter unit 312 to convert one or more data packets into the wireless signal are within the scope of the present disclosure.

FIG. 3 illustrates various components of the processing device 302 and the transceiver core 314 to control supplying of power and/or discontinuing supply of power to various components of the wireless device 300. In some embodiments, the power control unit 308 in the processing device 302 may be configured to communicate information, such as a power control signal, to various power switches to supply and/or discontinue power to various components of the wireless device 300. The power control unit 308 may communicate one or more power control signals to a transceiver core power switch 360, a receiver unit power switch 362, a transmitter unit power switch 364, and/or a transmit amplifier power switch 366. In response to a power control signal, each of the power switches may connect or disconnect a component of the wireless device 300 from a power supply (not shown). For example, the transceiver core power switch 360 may connect or disconnect the transceiver core 314 from the power supply, the receiver unit power switch 362 may connect or disconnect the receiver unit 310 from the power supply, the transmitter unit power switch 364 may connect or disconnect the transmitter unit 312 from the power supply, and the transmit amplifier power switch 366 may connect or disconnect the transmit amplifier 348 from the power supply. Each of the power switches may be a tri-state switch, a relay switch, or other type of switch for supplying power and/or discontinuing supply of power to a component of a wireless device.

In some embodiments, each of the first plurality of cores 106 or the second plurality of cores 124, illustrated in FIGS. 1A-1F, may be implemented to include a power control unit, such as the power control unit 308. For example, the first wireless device 102 may supply power to the first core 110 and the second core 112 by way of a power control unit before transmitting the plurality of data packets 131 by the first core 110 and the second core 112. In another example, the first wireless device 102 may discontinue supply of power to a suspended core (e.g., the first core 110 or the second core 112) by a power control unit after a threshold time elapsed since suspending the transmission of the plurality of data packets 131 by the suspended core, as set forth herein. In some embodiments, discontinuing supply of power to components of the wireless device 300 (e.g., the transceiver core 314, the transmitter unit 312, the transmit amplifier 348, etc.) may conserve power when the wireless device 300 is implemented as a portable device and thereby extend an operation time. For example, in a wireless device implemented with two transceiver cores, such as the transceiver core 314, discontinuing power to one of the transceiver cores may provide power savings on the order of 50%. In some embodiments, a transmit amplifier in a wireless device, such as the transmit amplifier 348, may consume a large quantity of power compared to other components. Hence, discontinuing power to the transmit amplifier may result in considerable power savings.

In some embodiments, the timer unit 309 included in the processing device 302 may be configured to provide a timing function for control of various power operations and/or components of the wireless device 300. The timer unit 309 may be implemented to determine an elapsed time after suspending transmission of the plurality of data packets 131 by the suspended core at reference number 140 in FIG. 1B. The processing device 302 may then compare the elapsed time to a threshold time and trigger the power control unit 308 to discontinue supply of power to the suspended core after the threshold time has elapsed. The timer unit 309 may be implemented to determine a unit of time for the processing device 302 to determine a number of ACKs received per unit of time. For example as indicated by reference numbers 156 and 160 of FIG. 1E, the processing device 302 may determine a number of ACKs received per unit of time in response to transmitting the initial plurality of data packets 158 by the first core 110 and the second core 112. The timer unit 309 may be implemented to determine a settled period of time TRset that a data rate has settled by the wireless device 300. For example, the wireless device 300 may experience a change in data rate based on an MCS implemented by the MAC unit 304 in response to communication of data packets and ACKs by the transceiver core 314. The timer unit 309 may compare the settled period of time TRset with a first threshold time T1 before the processing device 302 proceeds with suspension of transmission of data packets by a core and/or discontinuing supply of power to a suspended core, as set forth herein. Other arrangements and/or configurations of the wireless device 300, the transceiver core 314 and/or the processing device 302 are within the scope of the present disclosure.

Figure 4:
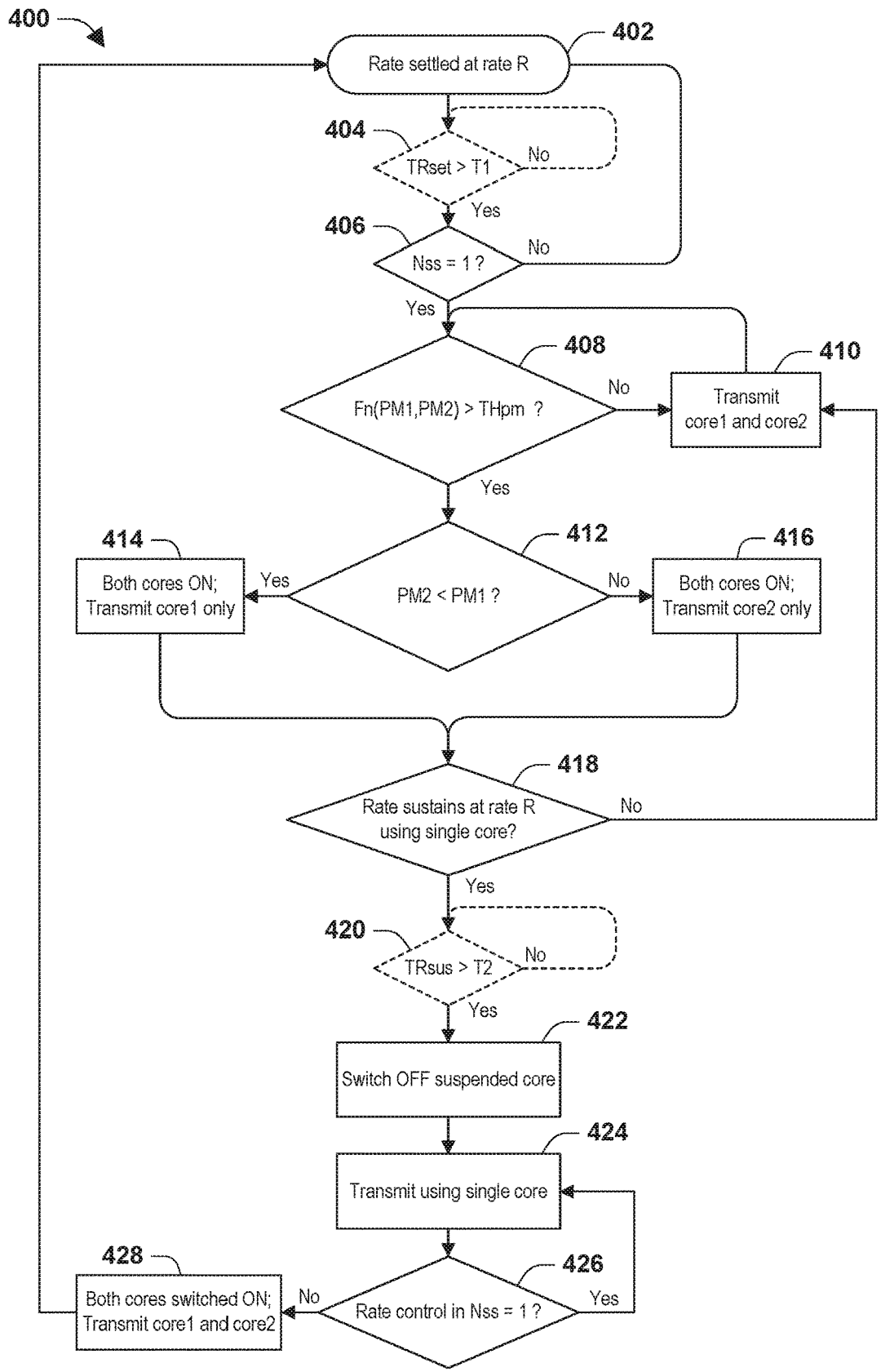
FIG. 4 is a flowchart illustrating a method of core transmit suspension, according to some embodiments.

FIG. 4 is a flowchart illustrating a method 400 of core transmit suspension, according to some embodiments. The method 400, as illustrated, is provided for an implementation in the first wireless device 102 that may transmit a plurality of spatial streams. During communication across the wireless medium 116, the first wireless device 102 may vary the number of spatial streams ($N_{SS}$) to a single spatial stream ($N_{SS}$=1) that transmits the same data packet (e.g., the data packet 132) with two cores (e.g., the first core 110 (i.e., core1), and the second core 112 (i.e., core2)). Each core may receive an ACK (e.g., the first core ACK 134a (i.e., ACK1), and the second core ACK 134b (i.e., ACK2)) corresponding to the same data packet (e.g., the data packet 132). A power metric PM may be determined by each core for each ACK (e.g., PM1 for ACK1, and PM2 for ACK2).

In some embodiments, the method 400 may be implemented in a wireless device transmitting more than two spatial streams (e.g., $N_{SS}$=3, $N_{SS}$=4, $N_{SS}$=5, etc.) and with more than two cores (e.g., core n). For example, the method 400 may be implemented with $N_{SS}$=3, and the first wireless device 102 may vary the $N_{SS}$ to a single spatial stream ($N_{SS}$=1) that transmits the same data packet with three cores. In this case, three power metrics (PM1, PM2, PM3) may be determined based on three ACKs (ACK1, ACK2, ACK3) of the data packet 132 by each of core 1, core2, and core 3. In this example, a highest power metric and a lowest power metric may be compared according to the method 400. If the method 400 results in suspension of a corresponding core, then the method 400 may be executed for evaluation of the remaining two cores based on corresponding power metrics of ACKs.

The method 400 may provide, at 402, that a data rate of data packet communication has settled at a data rate R. In some embodiments, the data rate may be settled by the MAC unit 304 of the processing device 302 according to an MCS. For example, the data rate may be based on transmission of the plurality of data packets 131 from the first wireless device 102 and reception of a plurality of ACKs, such as the first core ACK 134a (ACK1) and the second core ACK 134b (ACK2), from the second wireless device 120, as illustrated in FIG. 1A. In another example, the data rate may be based on transmission of the initial plurality of data packets 158 and reception of the initial plurality of ACKs 162, as illustrated in FIG. 1E.

In some embodiments and at 404, the method 400 may delay proceeding until the data rate has settled for a predetermined period of time. For example, the timer unit 309 of the processing device 302, illustrated in FIG. 3, may compare the settled period of time TRset with the first threshold time T1. If the settled period of time TRset is greater than the first threshold time T1, indicating that the data rate has settled for a predetermined period of time, flow may proceed to 406.

At 406, a determination is made whether the first wireless device 102 is communicating the plurality of data packets 131 with a single spatial stream ($N_{SS}$=1). For example, the first processing device 104 may determine that the data packet 132 is being transmitted by two of the first plurality of cores 106 (core1, core2). If $N_{SS}$=1, flow may proceed to 408. If $N_{SS} \neq 1$ (e.g., $N_{SS}$>1), flow may return to 402 until, for example, the first processing device 104 enables a single spatial stream.

At 408, a determination is made whether a function of a power metric of the first core ACK 134a (PM1) and a power metric of the second core ACK 134b (PM2) satisfies a threshold THpm, according to equations 1, 2, or 3, as set forth herein. For example and according to equation 3, a determination may be made whether an absolute value of a difference of an RSSI of the first core ACK 134a (RSSI1) and an RSSI of the second core ACK 134b (RSSI2) satisfies the threshold THpm (i.e., |RSSI1−RSSI2|>THpm). In some embodiments, the determination may be made, for example, by the processing device 302 illustrated in FIG. 3. If the threshold THpm is not satisfied, flow may proceed to 410, and the first wireless device 102 may continue to transmit on core1 and core2. If the threshold THpm is satisfied, flow may proceed to 412.

At 412, a determination is made of the lowest power metric by comparing PM1 (from the first core ACK 134a, core1) and PM2 (from the second core ACK 134b, core2).

If PM2 is the lowest power metric, flow may proceed 414. If PM1 is the lowest power metric, flow may proceed to 416. For example and according to equation 3, a determination may be made of the lowest RSSI by comparing RSSI1 and RSSI2, which were previously calculated at 408.

At 414, both cores (core1, core2) remain ON, and power is continually supplied to both cores by, for example, the power control unit 308 of FIG. 3. At 414, transmission of the plurality of data packets 131 only continues with core1. Core1 may be designated as a sustained core and core2 may be designated as a suspended core. Flow then proceeds to 418.

At 416, both cores (core1, core2) remain ON, and power is continually supplied to both cores by, for example, the power control unit 308 of FIG. 3. At 416, transmission of the plurality of data packets 131 only continues with core2. Core 2 may be designated as a sustained core and core1 may be designated as a suspended core. Flow then proceeds to 418.

At 418, a determination is made whether the data rate sustains at the data rate R using a single, sustained core. In some embodiments, as set forth herein, the data rate may be determined by the MAC unit 304 according to an MCS independent of operation of the PHY unit 306. For example and as illustrated in FIG. 1B at 140, the plurality of data packets 131 may be transmitted with a non-suspended core and the data rate may be determined based on reception of a plurality of ACKs. If the data rate changes from the data rate R to a second data rate, flow proceeds to 410 and the first wireless device 102 may resume transmission on the suspended core such that transmission of the plurality of data packets is provided by core1 and core2. If the data rate sustains at the data rate R, flow then proceeds to 420.

In some embodiments and at 420, the method 400 may delay proceeding until the data rate R has sustained for a predetermined period of time. For example, the timer unit 309 of the processing device 302, illustrated in FIG. 3, may compare the sustained period of time TRsus with a second threshold time T2. If the sustained period of time TRsus is greater than the second threshold time T2, indicating that the data rate has sustained at the data rate R for a predetermined period of time (TRsus), flow may proceed to 422.

At 422, the suspended core is switched OFF. For example and as illustrated in FIG. 3, the power control unit 308 may switch OFF the suspended core. The power control unit 308 may switch OFF the suspended core by controlling the transceiver core power switch 360 of the suspended core to turn OFF, controlling the transmitter unit power switch 364 of the suspended core to turn OFF, or controlling the transmit amplifier power switch 366 of the suspended core to turn OFF. Flow then proceeds to 424, and the first wireless device 102 continues to transmit using a single core, i.e., the non-suspended core.

At 426, the data rate is continually monitored using rate control for the single spatial stream, i.e. $N_{SS}=1$. For example, the data packet communication may be monitored based on transmission of the plurality of data packets 131 from the first wireless device 102 and reception of a plurality of ACKs from the second wireless device 120, as illustrated in FIG. 1A. The MAC unit 304, illustrated in FIG. 3, may monitor and control the data rate according to an MCS, as set forth herein. If the data rate sustains at the data rate R, flow may proceed to 424 and communication may proceed indefinitely using a single core until the data rate changes. If the data rate does not sustain at the data rate R, flow may proceed to 428.

At 428, both cores (core1, core2) may be switched ON, and the first wireless device may control both cores to transmit the plurality of data packets 131. Flow may then return to 402 to resume core transmit suspension, as set forth herein. Other arrangements and/or configurations for controlling transmission of the plurality of data packets 131 from the first wireless device 102 are within the scope of the present disclosure.

Figure 5:
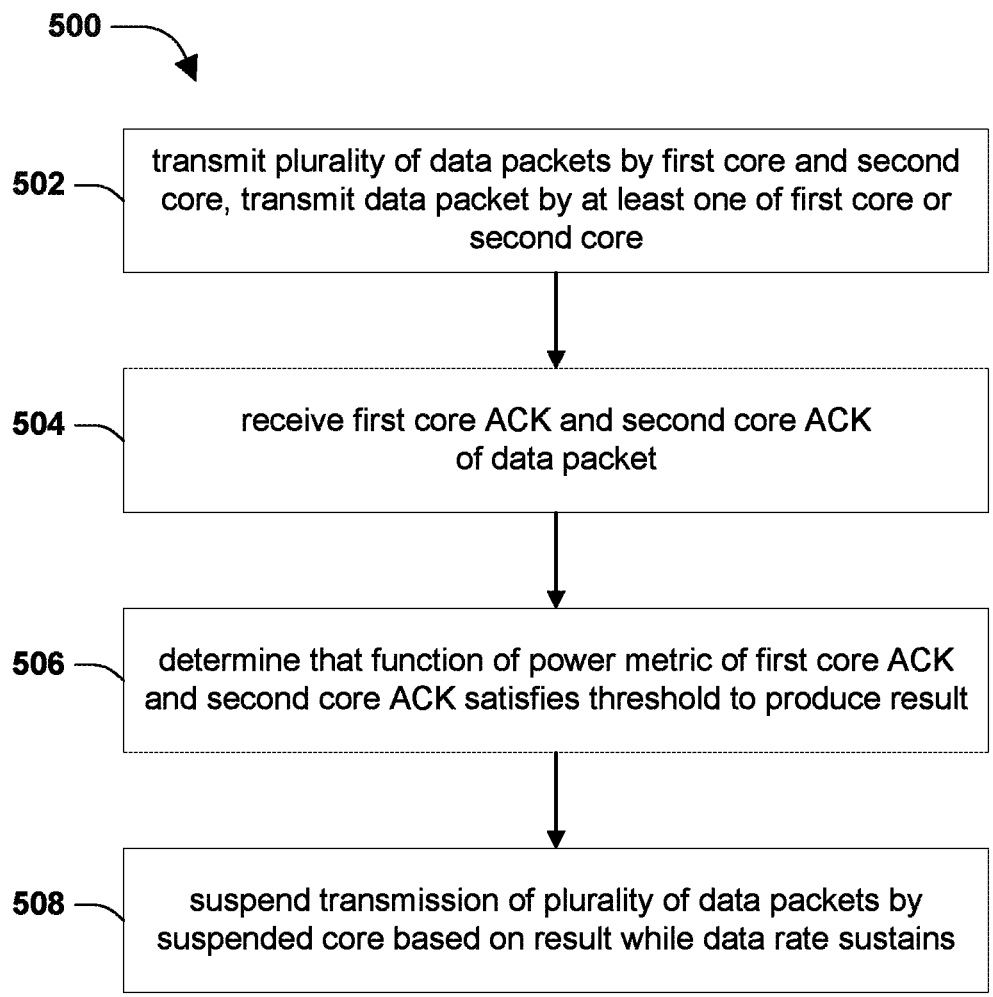
FIG. 5 is a flowchart illustrating a method of core transmit suspension, according to some embodiments.

FIG. 5 is a flowchart illustrating a method 500 of core transmit suspension, according to some embodiments. The method 500 may provide wireless communication performed by the first wireless device 102. At 502, the first wireless device 102 may transmit, to the second wireless device 120 and at a data rate, the plurality of data packets 131 by the first core 110 of the first wireless device 102 and the second core 112 of the first wireless device 102. A data packet 132 of the plurality of data packets 131 may be transmitted by at least one of the first core 110 and the second core 112.

At 504, the first wireless device 102 may receive, from the second wireless device 120, the first core ACK 134a of the data packet 132 by the first core 110 and the second core ACK 134b of the data packet 132 by the second core 112.

At 506, the first wireless device 102 may determine that a function of a power metric of the first core ACK 134a and a power metric of the second core ACK 134b satisfies a threshold to produce a result.

At 508, the first wireless device 102 may suspend, by the first wireless device 102 and while the data rate sustains, transmission of the plurality of data packets 131 by a suspended core of the first core 110 or the second core 112 based on the result. Other arrangements and/or configurations for performing core transmit suspension by the first wireless device 102 are within the scope of the present disclosure.

Although the present disclosure is not so limited, the following numbered examples demonstrate one or more aspects of the disclosure.

Example 1. A method of wireless communication performed by a first wireless device, comprising: transmitting, to a second wireless device and at a data rate, a plurality of data packets by a first core of the first wireless device and a second core of the first wireless device, wherein a data packet is transmitted by at least one of the first core or the second core; receiving, from the second wireless device, a first core acknowledgement (ACK) of the data packet by the first core and a second core ACK of the data packet by the second core; determining, by the first wireless device, that a function of a power metric of the first core ACK and a power metric of the second core ACK satisfies a threshold to produce a result; and suspending, by the first wireless device and while the data rate sustains, transmission of the plurality of data packets by a suspended core of the first core or the second core based on the result.

Example 2. The method of example 1, wherein: the first core is the suspended core when the power metric of the first core ACK is less than the power metric of the second core ACK, and the second core is the suspended core when the power metric of the first core ACK is greater than the power metric of the second core ACK.

Example 3. The method of any of examples 1-2 or any combination thereof, wherein: the function is an absolute value of a difference of the power metric of the first core ACK and the power metric of the second core ACK, the power metric of the first core ACK has a power metric type and the power metric of the second core ACK has the power metric type, and the power metric type is at least one of: a receive signal strength indicator (RSSI), a signal-to-noise ratio (SNR), or an eigenvalue.

Example 4. The method of any of examples 1-3 or any combination thereof, wherein the power metric of the first core ACK has a power metric type and the power metric of the second core ACK has the power metric type, the method comprising: adjusting the threshold based on the power metric type.

Example 5. The method of any of examples 1-4 or any combination thereof, comprising: resuming the transmission of the plurality of data packets by the suspended core based on a change in the data rate to a second data rate, wherein a second data packet is transmitted by at least one of the first core or the second core; receiving, from the second wireless device, a first core second ACK of the second data packet by the first core and a second core second ACK of the second data packet by the second core; determining, by the first wireless device, that a second function of a power metric of the first core second ACK and a power metric of the second core second ACK satisfies a second threshold to produce a second result; and suspending, by the first wireless device and while the second data rate sustains, transmission of the plurality of data packets by a second suspended core of the first core or the second core based on the second result.

Example 6. The method of any of examples 1-5 or any combination thereof, comprising: supplying, by the first wireless device and before transmitting the plurality of data packets by the first core and the second core, power to the first core and the second core; and discontinuing, by the first wireless device and after suspending the transmission of the plurality of data packets by the suspended core, supply of power to the suspended core after a threshold time elapsed since suspending the transmission of the plurality of data packets by the suspended core.

Example 7. The method of any of examples 1-6 or any combination thereof, comprising: transmitting, to the second wireless device and before transmitting the plurality of data packets by the first core and the second core, an initial plurality of data packets by the first core and the second core to determine an initial data rate; and adjusting, by the first wireless device and before transmitting the plurality of data packets by the first core and the second core, the initial data rate to the data rate with a modulation coding scheme (MCS) based on at least one of: a number of spatial streams, a coding metric, or a number of ACKs received per unit of time, from the second wireless device, in response to transmitting the initial plurality of data packets by the first core and the second core.

Example 8. The method of any of examples 1-7 or any combination thereof, comprising: adjusting, by the first wireless device and while suspending the transmission of the plurality of data packets by the suspended core, the data rate to a second data rate with a modulation coding scheme (MCS) based on at least one of: a coding metric, or a number of ACKs received per unit of time, from the second wireless device, in response to transmitting the plurality of data packets.

Example 9. The method of any of examples 1-8 or any combination thereof, wherein: adjusting the data rate to the second data rate with the MCS is performed by a medium access control (MAC) unit of the first wireless device without changing a number of spatial streams in response to suspending the transmission of the plurality of data packets by the suspended core, and suspending the transmission of the plurality of data packets by the suspended core is performed by a physical layer (PHY) unit of the first wireless device independently from adjusting the data rate to the second data rate with the MCS.

Example 10. The method of any of examples 1-9 or any combination thereof, wherein the coding metric is at least one of a number of data subcarriers, a number of coded bits per subcarrier per stream, a convolutional coding rate, a symbol duration, or a guard interval duration.

Example 11. The method of any of examples 1-10 or any combination thereof, wherein: the first core comprises a first transmitter unit for transmitting the plurality of data packets, and a first receiver unit for receiving the first core ACK of the data packet, and the second core comprises a second transmitter unit for transmitting the plurality of data packets, and a second receiver unit for receiving the second core ACK of the data packet.

Example 12. The method of any of examples 1-11 or any combination thereof, wherein the first wireless device is at least one of: a wireless local area network (WLAN) device, or a station (STA) to transmit the plurality of data packets according to at least one IEEE 802.11 wireless standard.

Example 13. A wireless device, comprising: a first core to transmit a plurality of data packets including a data packet, and receive a first core acknowledgement (ACK) of the data packet; a second core to transmit the plurality of data packets including the data packet, and receive a second core ACK of the data packet; and a processing device to: control a data rate of the plurality of data packets transmitted by the first core and the second core; determine that a function of a power metric of the first core ACK and a power metric of the second core ACK satisfies a threshold to produce a result; and suspend, while the data rate sustains, transmission of the plurality of data packets by a suspended core of the first core or the second core based on the result.

Example 14. The wireless device of example 13, wherein: the first core is the suspended core when the power metric of the first core ACK is less than the power metric of the second core ACK, and the second core is the suspended core when the power metric of the first core ACK is greater than the power metric of the second core ACK.

Example 15. The wireless device of any of examples 13-14 or any combination thereof, wherein: the power metric of the first core ACK is a receive signal strength indicator (RSSI) of the first core ACK and the power metric of the second core ACK is an RSSI of the second core ACK, and the function is an absolute value of a difference of the RSSI of the first core ACK and the RSSI of the second core ACK.

Example 16. The wireless device of any of examples 13-15 or any combination thereof, wherein: the power metric of the first core ACK has a power metric type and the power metric of the second core ACK has the power metric type, and the processing device adjusts the threshold based on the power metric type.

Example 17. The wireless device of any of examples 13-16 or any combination thereof, wherein the processing device: supplies power to the first core and the second core before the plurality of data packets are transmitted by the first core and the second core; and discontinues supply of power to the suspended core after a threshold time elapsed since suspending the transmission of the plurality of data packets by the suspended core.

Example 18. The wireless device of any of examples 13-17 or any combination thereof, wherein the processing device: controls the data rate by adjusting the data rate from an initial data rate with a modulation coding scheme (MCS) based on at least one of: a number of spatial streams, a coding metric, or a number of ACKs received per unit of time in response to transmitting an initial plurality of data packets by the first core and the second core.

Example 19. The wireless device of any of examples 13-18 or any combination thereof, wherein the processing device: controls the data rate by adjusting, while suspending the transmission of the plurality of data packets by the suspended core, the data rate to a second data rate with a modulation coding scheme (MCS) based on at least one of: a coding metric, or a number of ACKs received per unit of time in response to transmitting the plurality of data packets.

Example 20. A wireless system, comprising: a plurality of antennas; a first transceiver core coupled to at least one of the plurality of antennas; a second transceiver core coupled to at least one of the plurality of antennas; and a processing device comprising one or more processors to: control the first transceiver core to transmit a plurality of data packets including a data packet; control the second transceiver core to transmit the plurality of data packets including the data packet; control a data rate of the plurality of data packets transmitted by the first transceiver core and the second transceiver core; receive, from the first transceiver core, a first core acknowledgement (ACK) of the data packet; receive, from the second transceiver core, a second core ACK of the data packet; determine that a function of a power metric of the first core ACK and a power metric of the second core ACK satisfies a threshold to produce a result; and suspend, while the data rate sustains, transmission of the plurality of data packets by a suspended transceiver core of the first transceiver core or the second transceiver core based on the result.

It may be appreciated that combinations of one or more embodiments described herein, including combinations of embodiments described with respect to different figures, are contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method of wireless communication performed by a first wireless device, comprising:
    transmitting, to a second wireless device and at a data rate, a plurality of data packets by a first core of the first wireless device and a second core of the first wireless device, wherein a data packet is transmitted by at least one of the first core or the second core;
    receiving, from the second wireless device, a first core acknowledgement (ACK) of the data packet by the first core and a second core ACK of the data packet by the second core;
    determining, by the first wireless device, that a function of a power metric of the first core ACK and a power metric of the second core ACK satisfies a threshold to produce a result; and
    suspending, by the first wireless device and while the data rate sustains, transmission of the plurality of data packets by a suspended core of the first core or the second core based on the result.

2. The method of claim 1, wherein:
    the first core is the suspended core when the power metric of the first core ACK is less than the power metric of the second core ACK, and
    the second core is the suspended core when the power metric of the first core ACK is greater than the power metric of the second core ACK.

3. The method of claim 1, wherein:
    the function is an absolute value of a difference of the power metric of the first core ACK and the power metric of the second core ACK,
    the power metric of the first core ACK has a power metric type and the power metric of the second core ACK has the power metric type, the power metric type is at least one of: a receive signal strength indicator (RSSI), a signal-to-noise ratio (SNR), or an eigenvalue.

4. The method of claim 1, wherein the power metric of the first core ACK has a power metric type and the power metric of the second core ACK has the power metric type, the method comprising:
adjusting the threshold based on the power metric type.

5. The method of claim 1, comprising:
resuming the transmission of the plurality of data packets by the suspended core based on a change in the data rate to a second data rate, wherein a second data packet is transmitted by at least one of the first core or the second core;
receiving, from the second wireless device, a first core second ACK of the second data packet by the first core and a second core second ACK of the second data packet by the second core;
determining, by the first wireless device, that a second function of a power metric of the first core second ACK and a power metric of the second core second ACK satisfies a second threshold to produce a second result; and
suspending, by the first wireless device and while the second data rate sustains, transmission of the plurality of data packets by a second suspended core of the first core or the second core based on the second result.

6. The method of claim 1, comprising:
supplying, by the first wireless device and before transmitting the plurality of data packets by the first core and the second core, power to the first core and the second core; and
discontinuing, by the first wireless device and after suspending the transmission of the plurality of data packets by the suspended core, supply of power to the suspended core after a threshold time elapsed since suspending the transmission of the plurality of data packets by the suspended core.

7. The method of claim 1, comprising:
transmitting, to the second wireless device and before transmitting the plurality of data packets by the first core and the second core, an initial plurality of data packets by the first core and the second core to determine an initial data rate; and
adjusting, by the first wireless device and before transmitting the plurality of data packets by the first core and the second core, the initial data rate to the data rate with a modulation coding scheme (MCS) based on at least one of:
a number of spatial streams,
a coding metric, or
a number of ACKs received per unit of time, from the second wireless device, in response to transmitting the initial plurality of data packets by the first core and the second core.

8. The method of claim 1, comprising:
adjusting, by the first wireless device and while suspending the transmission of the plurality of data packets by the suspended core, the data rate to a second data rate with a modulation coding scheme (MCS) based on at least one of:
a coding metric, or
a number of ACKs received per unit of time, from the second wireless device, in response to transmitting the plurality of data packets.

9. The method of claim 8, wherein:
adjusting the data rate to the second data rate with the MCS is performed by a medium access control (MAC) unit of the first wireless device without changing a number of spatial streams in response to suspending the transmission of the plurality of data packets by the suspended core, and
suspending the transmission of the plurality of data packets by the suspended core is performed by a physical layer (PHY) unit of the first wireless device independently from adjusting the data rate to the second data rate with the MCS.

10. The method of claim 8, wherein the coding metric is at least one of a number of data subcarriers, a number of coded bits per subcarrier per stream, a convolutional coding rate, a symbol duration, or a guard interval duration.

11. The method of claim 1, wherein:
the first core comprises a first transmitter unit for transmitting the plurality of data packets, and a first receiver unit for receiving the first core ACK of the data packet, and
the second core comprises a second transmitter unit for transmitting the plurality of data packets, and a second receiver unit for receiving the second core ACK of the data packet.

12. The method of claim 1, wherein the first wireless device is at least one of:
a wireless local area network (WLAN) device, or
a station (STA) to transmit the plurality of data packets according to at least one IEEE 802.11 wireless standard.

13. A wireless device, comprising:
a first core to transmit a plurality of data packets including a data packet, and receive a first core acknowledgement (ACK) of the data packet;
a second core to transmit the plurality of data packets including the data packet, and receive a second core ACK of the data packet; and
a processing device to:
control a data rate of the plurality of data packets transmitted by the first core and the second core;
determine that a function of a power metric of the first core ACK and a power metric of the second core ACK satisfies a threshold to produce a result; and
suspend, while the data rate sustains, transmission of the plurality of data packets by a suspended core of the first core or the second core based on the result.

14. The wireless device of claim 13, wherein:
the first core is the suspended core when the power metric of the first core ACK is less than the power metric of the second core ACK, and
the second core is the suspended core when the power metric of the first core ACK is greater than the power metric of the second core ACK.

15. The wireless device of claim 13, wherein:
the power metric of the first core ACK is a receive signal strength indicator (RSSI) of the first core ACK and the power metric of the second core ACK is an RSSI of the second core ACK, and
the function is an absolute value of a difference of the RSSI of the first core ACK and the RSSI of the second core ACK.

16. The wireless device of claim 13, wherein:
the power metric of the first core ACK has a power metric type and the power metric of the second core ACK has the power metric type, and
the processing device adjusts the threshold based on the power metric type.

17. The wireless device of claim 13, wherein the processing device:
supplies power to the first core and the second core before the plurality of data packets are transmitted by the first core and the second core; and
discontinues supply of power to the suspended core after a threshold time elapsed since suspending the transmission of the plurality of data packets by the suspended core.

18. The wireless device of claim 13, wherein the processing device:
controls the data rate by adjusting the data rate from an initial data rate with a modulation coding scheme (MCS) based on at least one of:
a number of spatial streams,
a coding metric, or
a number of ACKs received per unit of time in response to transmitting an initial plurality of data packets by the first core and the second core.

19. The wireless device of claim 13, wherein the processing device:
controls the data rate by adjusting, while suspending the transmission of the plurality of data packets by the suspended core, the data rate to a second data rate with a modulation coding scheme (MCS) based on at least one of:
a coding metric, or
a number of ACKs received per unit of time in response to transmitting the plurality of data packets.

20. A wireless system, comprising:
a plurality of antennas;
a first transceiver core coupled to at least one of the plurality of antennas;
a second transceiver core coupled to at least one of the plurality of antennas; and
a processing device comprising one or more processors to:
control the first transceiver core to transmit a plurality of data packets including a data packet;
control the second transceiver core to transmit the plurality of data packets including the data packet;
control a data rate of the plurality of data packets transmitted by the first transceiver core and the second transceiver core;
receive, from the first transceiver core, a first core acknowledgement (ACK) of the data packet;
receive, from the second transceiver core, a second core ACK of the data packet;
determine that a function of a power metric of the first core ACK and a power metric of the second core ACK satisfies a threshold to produce a result; and
suspend, while the data rate sustains, transmission of the plurality of data packets by a suspended transceiver core of the first transceiver core or the second transceiver core based on the result.

* * * * *